United States Patent [19]
Yanai et al.

[11] Patent Number: 5,369,512
[45] Date of Patent: Nov. 29, 1994

[54] ACTIVE MATRIX LIQUID CRYSTAL DISPLAY WITH VARIABLE COMPENSATION CAPACITOR

[75] Inventors: Kenichi Yanai; Tsutomu Tanaka; Tatsuya Kakehi; Koji Ohgata; Kenichi Oki, all of Kawasaki, Japan

[73] Assignee: Fujitsu Limited, Kawasaki, Japan

[21] Appl. No.: 916,361

[22] Filed: Jul. 21, 1992

[30] Foreign Application Priority Data

Jul. 24, 1991 [JP] Japan .................. 3-184626
Aug. 28, 1991 [JP] Japan .................. 3-217426

[51] Int. Cl.⁵ ........................... G02F 1/1343
[52] U.S. Cl. ........................... 359/59; 345/92; 257/595; 257/532; 359/58
[58] Field of Search .................. 359/54, 55, 56, 57, 359/58, 59, 60; 340/784; 345/92; 257/595, 532

[56] References Cited

U.S. PATENT DOCUMENTS

| | | | |
|---|---|---|---|
| 4,393,380 | 7/1983 | Hosokawa et al. | 340/805 |
| 4,519,678 | 5/1985 | Komatsubara et al. | 359/70 |
| 4,582,395 | 5/1986 | Morozumi | 345/92 |
| 4,944,575 | 7/1990 | Aigrain et al. | 350/333 |
| 5,173,791 | 12/1992 | Strathman et al. | 359/57 |
| 5,191,322 | 3/1993 | Katayama et al. | 345/92 |
| 5,250,931 | 10/1993 | Misawa et al. | 345/206 |

FOREIGN PATENT DOCUMENTS

| | | |
|---|---|---|
| 0347117 | 12/1989 | European Pat. Off. |
| 0430592 | 5/1991 | European Pat. Off. |
| 0456453 | 11/1991 | European Pat. Off. |
| 0010619 | 1/1987 | Japan |
| 4-14091 | 1/1992 | Japan |
| 4-14092 | 1/1992 | Japan |
| 4-102825 | 4/1992 | Japan |

*Primary Examiner*—William L. Sikes
*Assistant Examiner*—Kenneth Parker
*Attorney, Agent, or Firm*—Staas & Halsey

[57] ABSTRACT

An active matrix liquid crystal display apparatus comprises first and second substrates facing each other through a liquid crystal layer. The first substrate has a plurality of scan bus lines, thin film transistors, display electrodes, and reference potential supplying bus lines, and the second substrate has a plurality of stripe-like data bus lines that face the display electrodes. The display electrode has a compensation capacitor for compensating a potential fluctuation occurring in the display electrode after a gate electrode of the thin film transistor is selected. The capacitance of the compensation capacitor is larger during a compensation period than during a storage period in which the gate electrode of the corresponding thin film transistor is not selected.

19 Claims, 27 Drawing Sheets

COMPENSATION
VOLTAGE Vc :

$$Vc = \frac{C_{GS}^A}{C_{GS}^C} V_g$$

CROSS TALK
COUPLING
CONSTANT $\alpha$ :

$$\alpha = \frac{C_{GS}^C + C_{GS}^A + C_{RS}}{C_{LC} + C_{GS}^C + C_{GS}^A + C_{RS}}$$

WHERE ; $C_{RS} = C_{RS}^1 + C_{RS}^2$

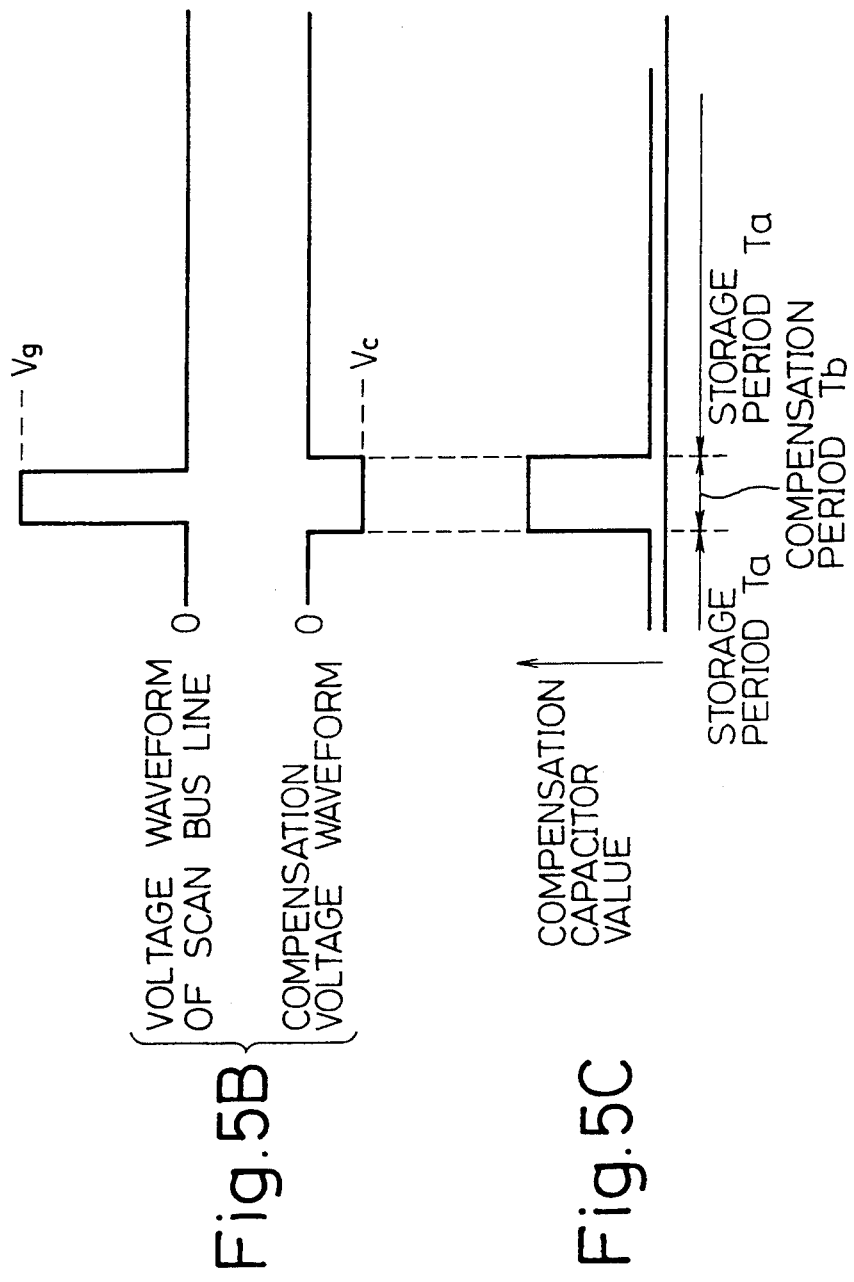

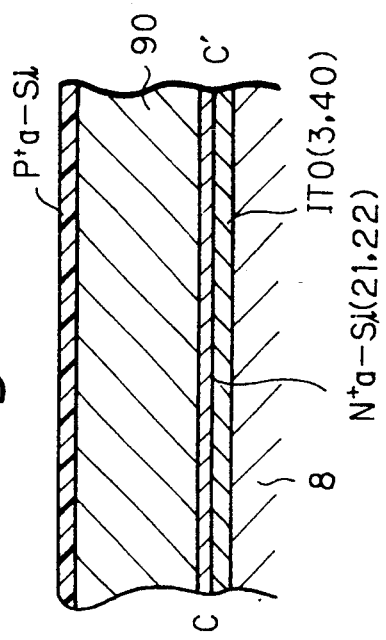
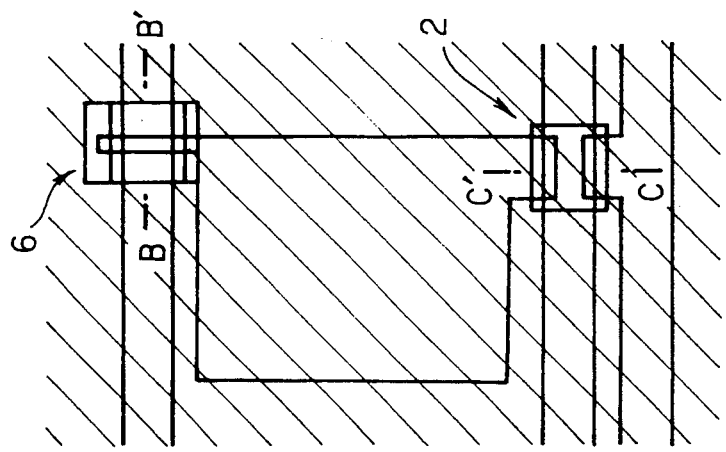

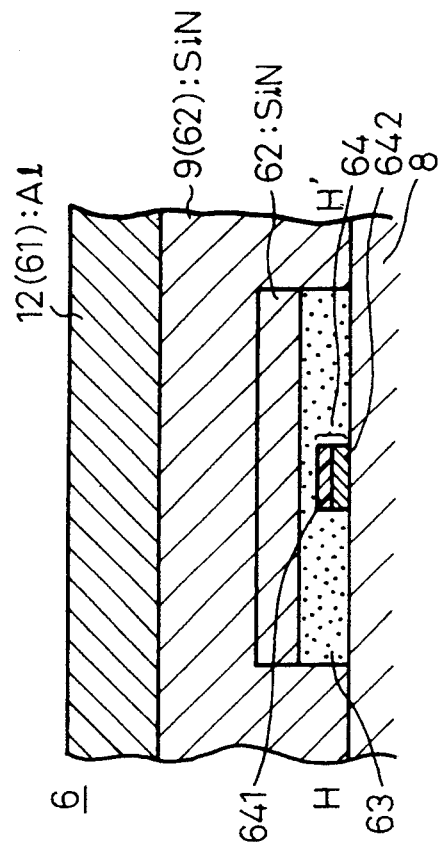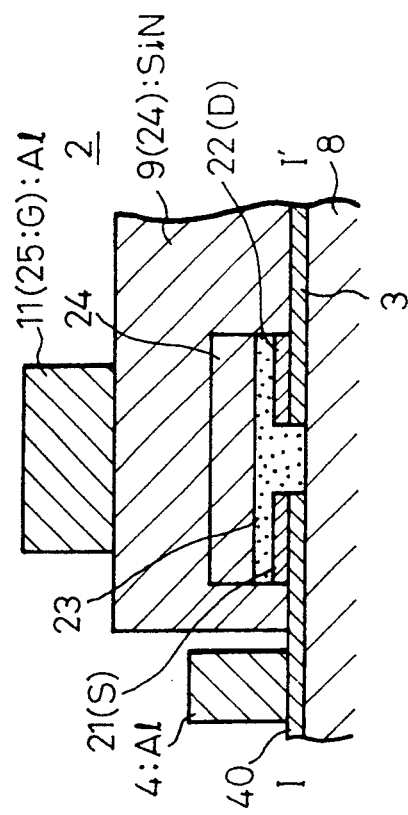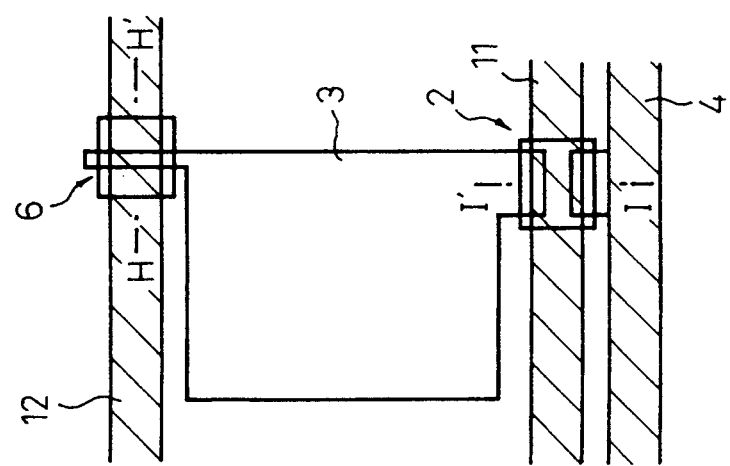

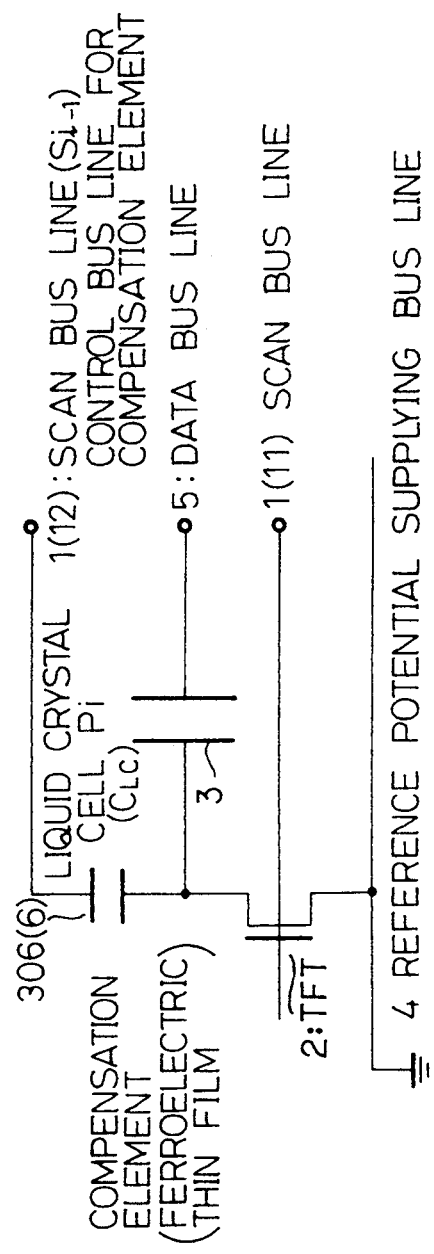

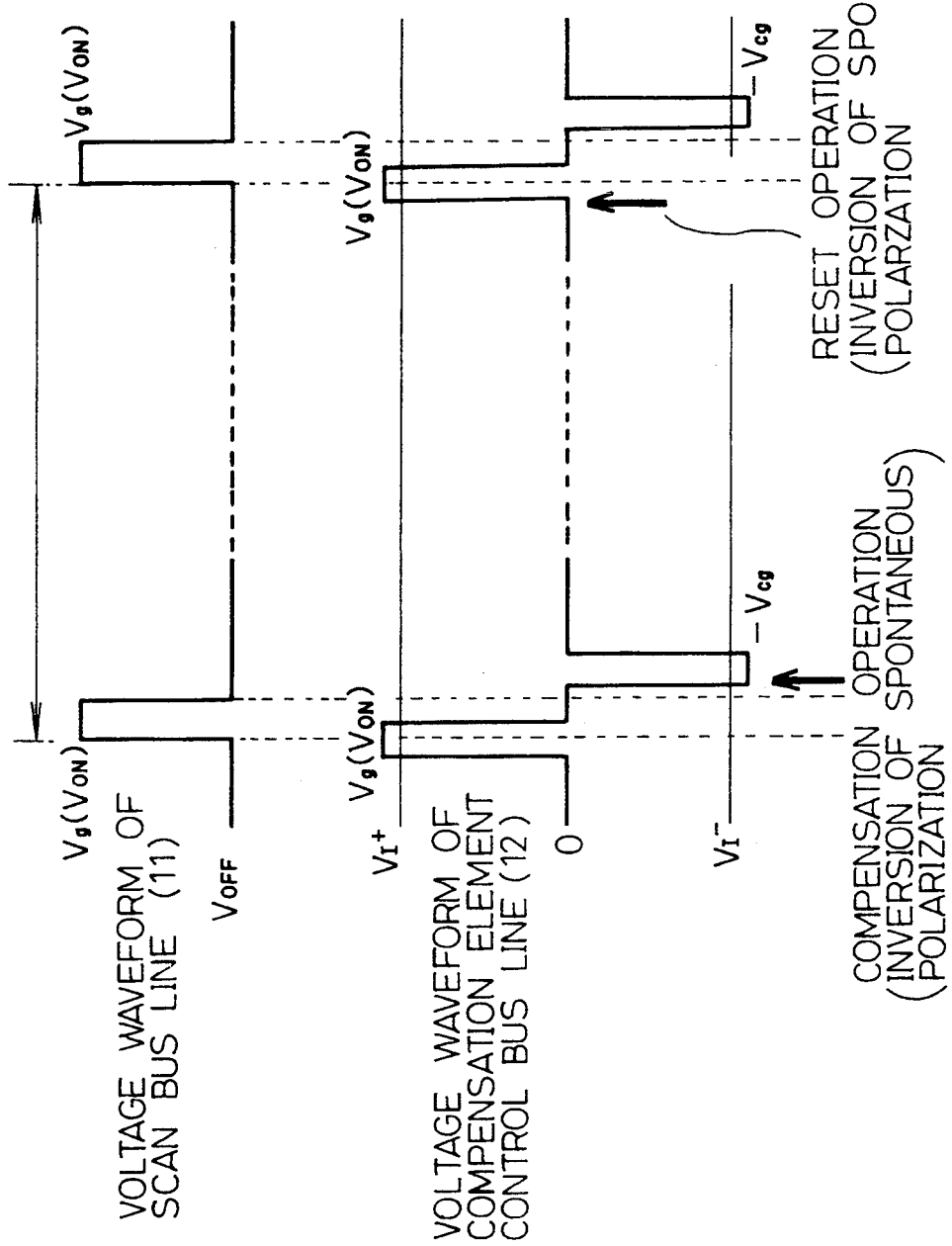

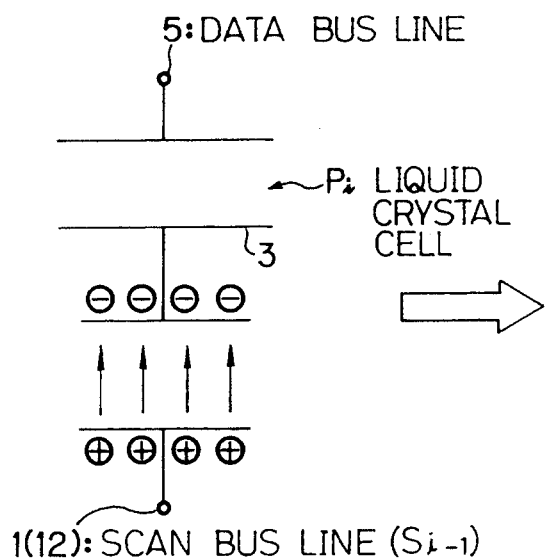
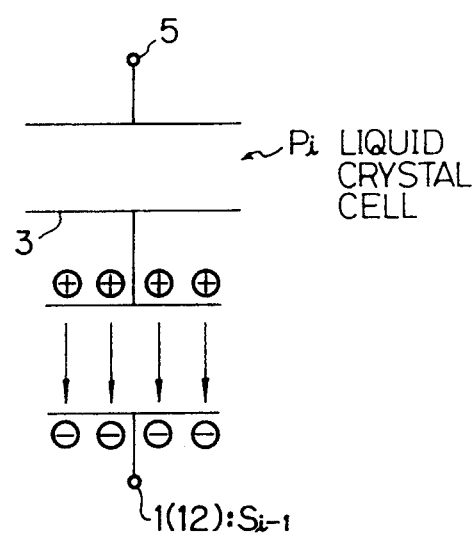
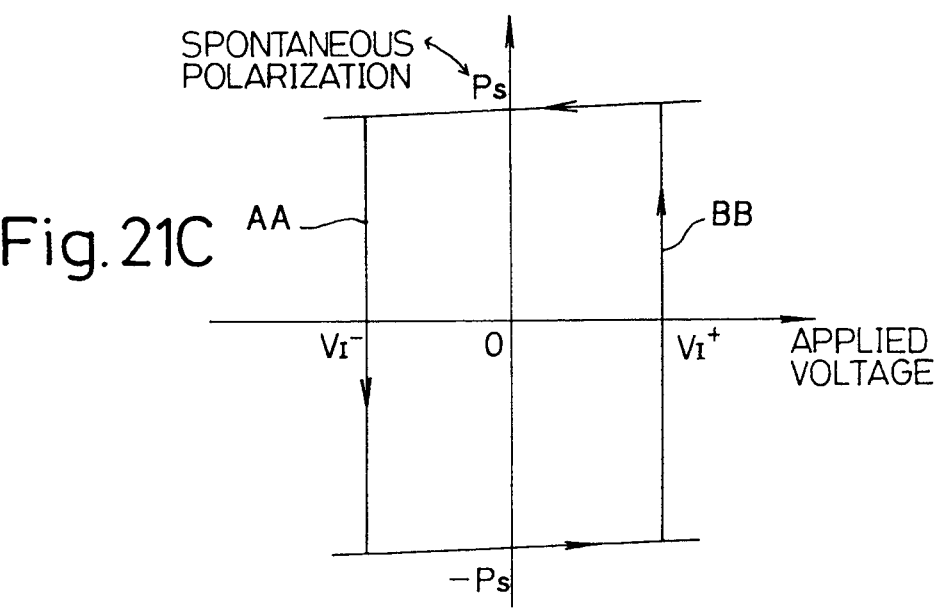

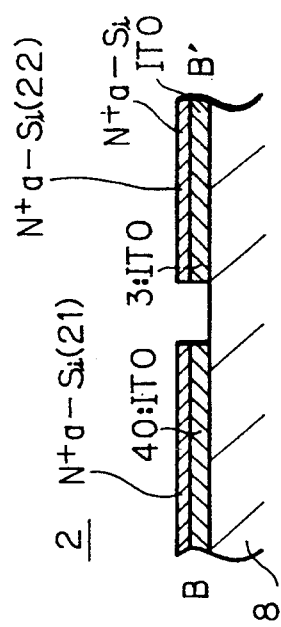
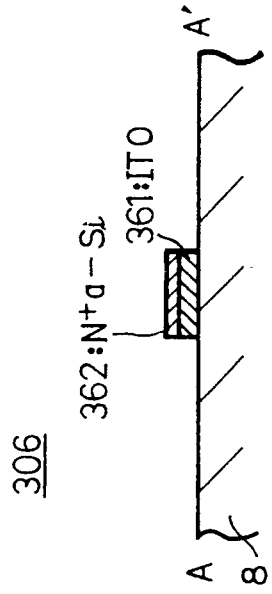
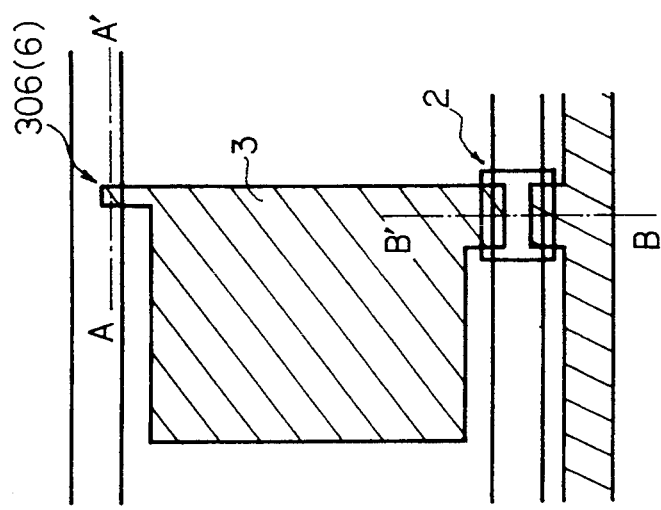

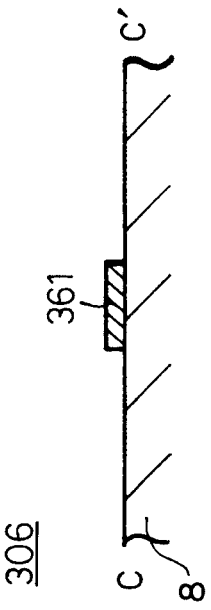
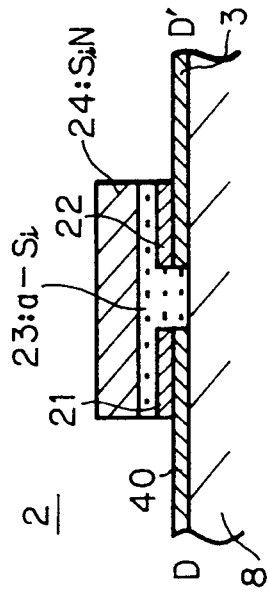
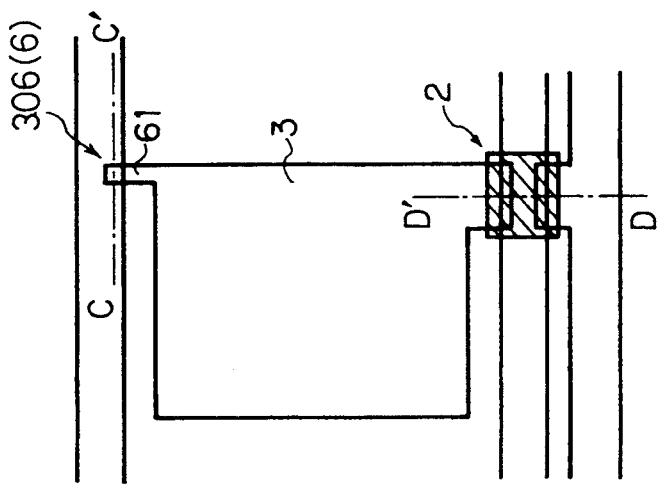

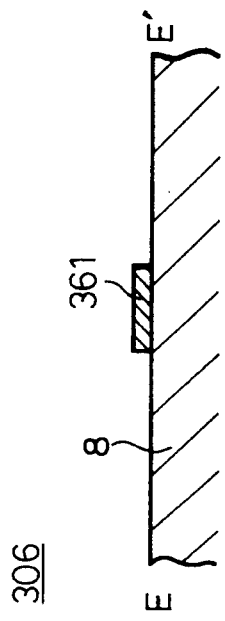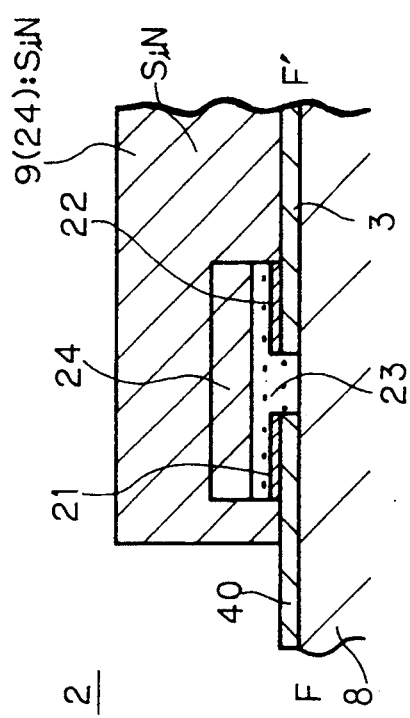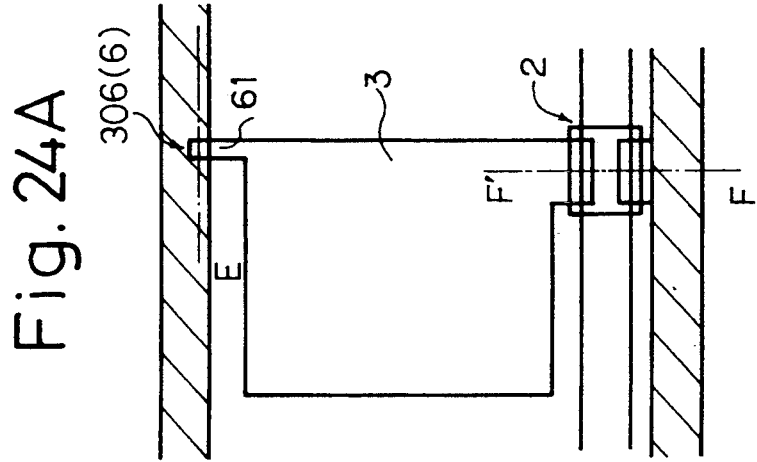

ACTIVE MATRIX LIQUID CRYSTAL DISPLAY WITH VARIABLE COMPENSATION CAPACITOR

BACKGROUND OF THE INVENTION

1. Field of the Invention

The present invention relates to an active matrix liquid crystal display apparatus, and more particularly, to an opposed active matrix liquid crystal display apparatus having thin film transistors (TFTs) and liquid crystal cells, the TFTs corresponding to pixels, respectively, and being switched ON and OFF to write and hold voltages in the liquid crystal cells.

2. Description of the Related Art

Recently, active matrix liquid crystal display apparatuses have been widely used for lap-top personal computers, word processors, portable television sets, and the like, since the active matrix liquid crystal display apparatuses are thin similar to simple matrix liquid crystal display apparatuses. Note, pixels of the active matrix liquid crystal display apparatus are driven by the thin film transistors, respectively. Therefore, the display capacity and the number of lines of the display apparatus can be increased without deteriorating the drive duty, contrast, and angle of visibility, unlike the simple matrix liquid crystal display apparatus. The active matrix liquid crystal display apparatus realizes substantially the same color display quality as a cathode ray tube (CRT), and therefore, is useful as a flat display apparatus.

Since the active matrix liquid crystal display apparatus employs thin film transistors each serving as a switching element for each pixel, it inevitably involves complicated production processes. Large facilities will be required, therefore, to manufacture large-sized display apparatuses. In this way, the active matrix liquid display apparatuses involve expensive facilities and a poor yield, thereby increasing costs. Presently marketed active matrix liquid crystal display apparatuses are limited, therefore, to those of relatively small size.

In order to improve the yield of the active matrix liquid crystal display apparatuses, which is usually low because of their complicated structure, there has been proposed an opposed active matrix liquid crystal display apparatus involving scan bus lines and data bus lines formed on respective, different substrates so that the bus lines may not intersect one another. Improvement of display quality is also required.

A conventional active matrix liquid crystal display apparatus employs a single substrate on which scan bus lines and data bus lines are orthogonally formed, and display electrodes are connected to the intersections of the bus lines through thin film transistors. The scan bus lines and data bus lines intersect one another on the same substrate, and the conventional active matrix liquid crystal display apparatus sometimes has poor insulation causing short circuits at the intersections, or disconnections in upper bus lines owing to steps formed at the intersections. Since lower bus lines and an insulation layer cannot be unlimitedly thickened, it is not easy to reduce the resistance of the lower bus lines. When the insulation layer cannot be thickened, it is impossible to completely prevent short circuits at the intersections.

In order to solve the above problems, the opposed active matrix liquid crystal display apparatus has been proposed. In this display apparatus, scan bus lines and data bus lines are disposed on respective, different substrates such as glass substrates that face each other with a liquid crystal layer between them.

Note, in the opposed active matrix liquid crystal display apparatus, the data bus lines and scan bus lines are orthogonal to each other with the liquid crystal layer interposed between them, and thus it is not necessary to prepare an insulation layer for the intersections, thereby simplifying the structure. Further, the data bus lines and scan bus lines will not be short-circuited. This reduces display failure and improves an yield compared with the conventional, or normal-type, active matrix liquid crystal display apparatus.

Nevertheless, the opposed active matrix liquid crystal display apparatus frequently causes cross talk, and a liquid crystal cell voltage fluctuates owing to data voltages applied to the other cells, thereby to deteriorate display quality. In order to reduce the cross talk, compensate for the DC voltage level shift, and improve display quality, the inventors have proposed an active matrix liquid crystal display apparatus (Japanese Unexamined Patent Publication Ser. No. 4-102825 corresponding to U.S. patent application Ser. No. 07/695,029).

SUMMARY OF THE INVENTION

An object of the present invention is to solve the problems of the conventional active matrix liquid crystal display apparatuses and provide an active matrix liquid crystal display apparatus that realizes a high yield, is inexpensive, and has a large natural color screen. Further, another object of the present invention is to solve the problems of the conventional active matrix liquid crystal display apparatuses and provide an active matrix liquid crystal display apparatus that employs compensation capacitors having a small element area for compensating a DC voltage level shift, to realize a high yield, low cost, and a large natural color screen.

According to the present invention, there is provided an active matrix liquid crystal display apparatus comprising first and second substrates facing each other through a liquid crystal layer, wherein the first substrate having a plurality of scan bus lines, thin film transistors, display electrodes, and reference potential supplying bus lines; each of the thin film transistors having a gate electrode connected to the scan bus line, a source electrode connected to either of the display electrode and the reference potential supplying bus line, and a drain electrode connected to the other the display electrode and the reference potential supplying bus line; the second substrate having a plurality of stripe-like data bus lines that face the display electrodes; each of the display electrodes having a compensation capacitor for compensating a potential fluctuation occurring in the display electrode after the gate electrode of the thin film transistor is selected; and the capacitance of the compensation capacitor being larger during a compensation period than during a storage period in which the gate electrode of the corresponding thin film transistor is not selected.

The capacitance of the compensation capacitor may be controlled by a voltage. The scan bus line may comprise a first scan bus line for controlling the thin film transistor and a second scan bus line for controlling the compensation capacitor. The first and second scan bus lines may be disposed in parallel formation on each side of the reference potential supplying bus line, and the second scan bus line may receive a signal for controlling the display electrodes that are located adjacent to the first scan bus line.

The scan bus line or the reference potential supplying bus line may serve as a compensation voltage controlling electrode bus line for controlling the compensation voltage. The compensation capacitor may have a laminated structure comprising, from the top to the bottom, an upper electrode, an insulation layer, a semiconductor layer, and a lower electrode, and wherein an area where the upper electrode overlaps the semiconductor layer may be larger than an area where the upper electrode overlaps the lower electrode. The compensation capacitor may have a laminated structure comprising, from the top to the bottom, an upper electrode, a semiconductor layer, an insulation layer, and a lower electrode, and wherein an area where the semiconductor layer overlaps the lower electrode may be larger than an area where the upper electrode overlaps the lower electrode.

The upper or lower electrode adjacent to the semiconductor layer may comprise an electrode portion and an ohmic contact portion in contact with the adjacent semiconductor layer, and carriers induced at the ohmic contact portion may control charges induced in the semiconductor layer. The semiconductor layer may be an amorphous silicon layer used to fabricate the thin film transistors.

During the compensation period, a sign of charges induced in the semiconductor layer of the compensation capacitor may differ from a sign of carriers produced when the gate electrode of the thin film transistor is selected, and wherein the electrode adjacent to the semiconductor layer of the compensation capacitor may be connected to the display electrode, and the electrode adjacent to the insulation layer thereof may be connected to the compensation voltage controlling electrode. Further, during the compensation period, a sign of charges induced in the semiconductor layer of the compensation capacitor may be the same as a sign of carriers produced when the gate electrode of the thin film transistor is selected, and wherein the electrode adjacent to the insulation layer of the compensation capacitor may be connected to the display electrode, and the electrode adjacent to the semiconductor layer thereof may be connected to the compensation voltage controlling electrode.

The compensation capacitor may be made of a ferroelectric thin film. Note, spontaneous polarization in the ferroelectric thin film of the compensation capacitor may be inverted when or just after the gate electrode of the thin film transistor is selected, to compensate for a potential fluctuation occurring in the display electrode after the gate electrode of the thin film transistor is selected. A gate selection voltage of the thin film transistor relative to the voltage of the display electrode may be larger than a voltage for inverting the spontaneous polarization in the ferroelectric thin film of the compensation capacitor. The spontaneous polarization in the ferroelectric thin film of the compensation capacitor may be again inverted just before the display electrode connecting the compensation capacitor is selected, to reset the compensation capacitor. One electrode of the compensation capacitor may be connected to the display electrode, and the other electrode of the compensation capacitor may be connected to a scan bus line that is ahead in scanning order.

BRIEF DESCRIPTION OF THE DRAWINGS

The present invention will be more clearly understood from the description of the preferred embodiments as set forth below with reference to the accompanying drawings, wherein:

FIGS. 5A to 5C are diagrams showing a principle of an active matrix liquid crystal display apparatus according to a first aspect of the present invention;

FIGS. 9A~9C to 12A~12C are diagrams explaining manufacturing processes of the active matrix liquid crystal display apparatus according to a first embodiment of the present invention;

FIGS. 18A to 18C are diagrams showing a principle of an active matrix liquid crystal display apparatus according to a second aspect of the present invention;

FIGS. 21A to 21C are diagrams explaining a compensation capacitor of the active matrix liquid crystal display apparatus of the second aspect of the present invention; and FIGS. 22A~22C to 25A~25C are diagrams explaining manufacturing processes of the active matrix liquid crystal display apparatus according to a third embodiment of the present invention.

DESCRIPTION OF THE PREFERRED EMBODIMENTS

For a better understanding of the preferred embodiments, the problems of the related art will be explained, with reference to FIGS. 1 to 4.

A conventional active matrix liquid crystal display apparatus employs a single substrate on which scan bus lines and data bus lines are orthogonally formed, and display electrodes are connected to the intersections of the bus lines through thin film transistors. The scan bus lines and data bus lines intersect one another on the same substrate, and thus the conventional active matrix liquid crystal display apparatus sometimes causes poor insulation and short circuits at the intersections, or disconnections in upper bus lines because of steps formed at the intersections. Since lower bus lines and an insulation layer cannot be unlimitedly thickened, it is not easy to reduce the resistance of the lower bus lines. When the insulation layer cannot be thickened, it is impossible to completely prevent short circuits at the intersections.

In order to solve the above problems, the opposed active matrix liquid crystal display apparatus has been proposed. In this display apparatus, scan bus lines and data bus lines are disposed on respective substrates such as glass substrates that face each other with a liquid crystal layer between them.

Figure 1:
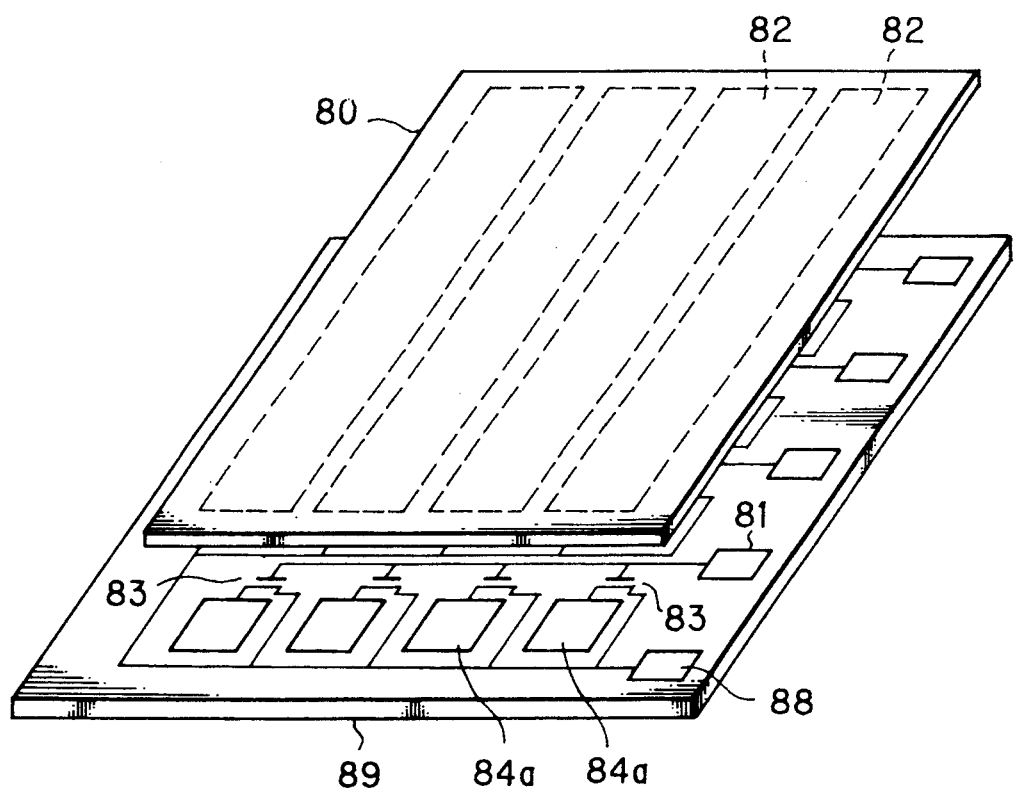
FIG. 1 is an enlarged perspective diagram showing substrates of an opposed active matrix liquid crystal display apparatus according to the prior art.
Figure 2:
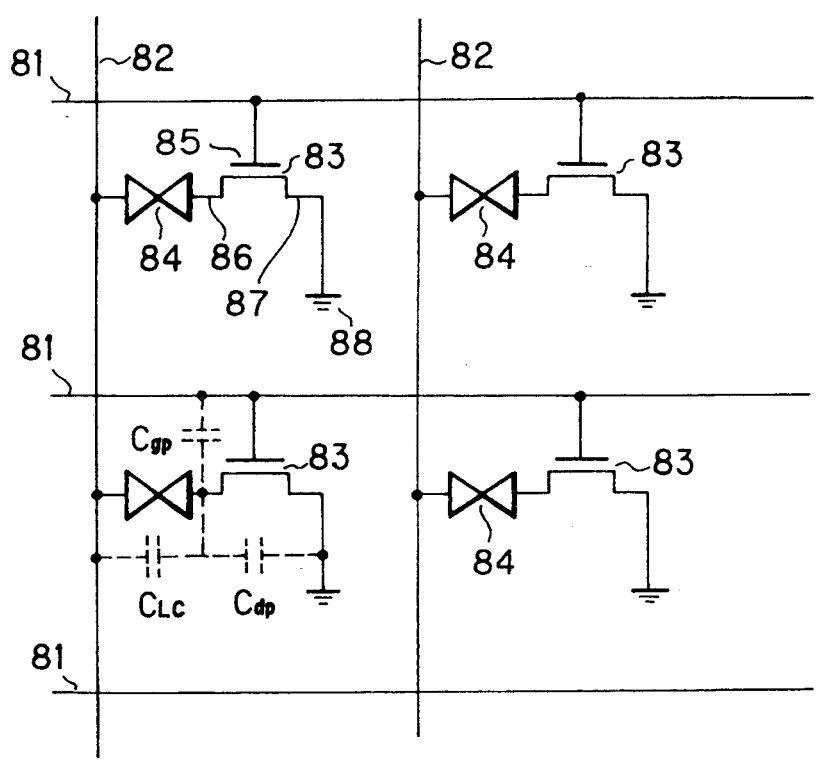
FIG. 2 is a diagram showing an equivalent circuit of the active matrix liquid crystal display apparatus of FIG. 1.

FIG. 1 shows substrates of an opposed active matrix liquid crystal display apparatus according to a prior art, and FIG. 2 shows an equivalent circuit of the active matrix liquid crystal display apparatus of FIG. 1.

As shown in FIG. 1, the opposed active matrix liquid crystal display apparatus comprises a glass substrate 80 and another glass substrate 89 that are arranged on each side of a liquid crystal layer (not shown). On the glass substrate (TFT substrate) 89, there are formed scan bus lines 81, thin film transistors 83, display electrodes 84a for forming liquid crystal cells 84, and reference potential supplying bus lines 88 (grounding in FIG. 2). On the other glass substrate (opposite substrate) 80, there are arranged stripe-like data bus lines 82. Liquid crystals are sealed between the stripe-like data bus lines 82 and the display electrodes 84a, thereby forming the liquid crystal cells 84. Each liquid crystal cell 84 is connected between the data bus line 82 and a drain electrode (or source electrode) 86 of the thin film transistor 83. A gate electrode (gate) 85 of the thin film transistor 83 is connected to the scan bus line 81, and the source electrode (or drain electrode) of the thin film transistor 83 is connected to the reference potential supplying bus line 88.

In the above arrangement, the data bus lines 82 and scan bus lines 81 are orthogonal to each other with the liquid crystal layer interposed between them. Since these bus lines do not intersect one another on a single substrate, it is not necessary to prepare an insulation layer for the intersections, thereby simplifying the structure. In addition, the data bus lines 82 and scan bus lines 81 will not be short-circuited. This reduces display failure and improves an yield compared with the conventional normal-type active matrix liquid crystal display apparatus that involves scan bus lines and data bus lines orthogonally formed on a single substrate with display electrodes connected to the intersections of the bus lines through thin film transistors.

It is known that, compared with the conventional normal-type active matrix liquid crystal display apparatus, the opposed active matrix liquid crystal display apparatus frequently causes cross talk. Namely, even if the thin film transistors are OFF in the opposed active matrix liquid crystal display apparatus, data voltages sequentially applied to the data bus lines affect the liquid crystal cells through electrostatic capacitance. (The electrostatic capacitance includes that occurring between the scan bus line to which the gate of the thin film transistor is connected and the display electrode of the liquid crystal cell and that occurring between the display electrode and the data bus line, or that occurring between the display electrode and the reference potential supplying bus line. i.e., between the source electrode (source) and the drain electrode (drain) of the thin film transistor.) In this way, a liquid crystal cell voltage fluctuates due to data voltages applied to the other cells and thereby deteriorates display quality.

It is possible for the conventional normal-type active matrix liquid crystal display apparatus to add storage capacitors to reduce the capacitive coupling ratio. It is impossible, however, for the opposed active matrix liquid crystal display apparatus to add such storage capacitors to reduce the capacitive coupling ratio. Since it is difficult to add the storage capacitors, a DC voltage level shift occurs thereby causing an afterimage just after the scan bus line (81) connected to the gate (85) of the thin film transistor (83) is selected. In particular, a still picture creates stickness to thereby degrade display quality.

To reduce cross talk, compensate for the DC voltage level shift, and improve display quality, the inventors have proposed an active matrix liquid crystal display apparatus (Japanese Unexamined Patent Publication No. 4-102825, corresponding to U.S. patent application Ser. No. 07/695,029, as shown in FIG. 3).

Figure 3:
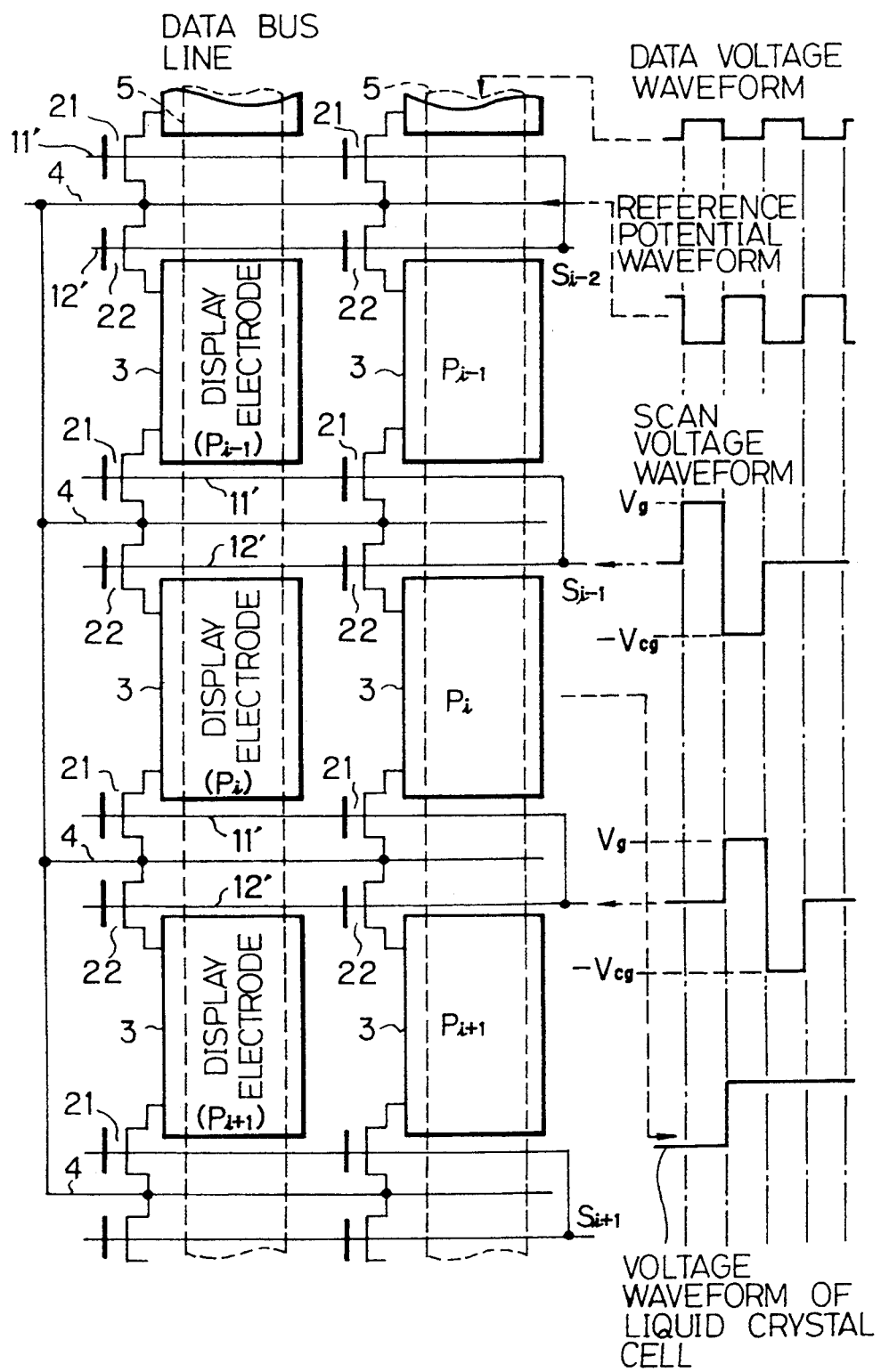
FIG. 3 is a diagram showing an example of an active matrix liquid crystal display apparatus according to the related art.

FIG. 3 shows the active matrix liquid crystal display apparatus of the related art.

In FIG. 3, the active matrix liquid crystal display apparatus proposed by the Japanese Unexamined Patent Publication No. 4-102825 realizes a high yield and displays excellent pictures with no afterimages. This display apparatus employs compensation thin film transistors (TFTs) for compensating DC voltage level shifts that may cause afterimages. This display apparatus comprises two substrates disposed on each side of a liquid crystal layer. One (TFT substrate 89) of the two substrates has a plurality of scan bus lines 11' and 12', thin film transistors 21 and 22, display electrodes 3, and reference potential supplying bus lines 4. The other (opposite substrate 80) of the two substrates has a plurality of stripe-like data bus lines 5 that face the display electrodes 3. The scan bus lines 11' and 12' are disposed in parallel formation on each side of the reference potential supplying bus line 4.

Each thin film transistor 21 selectively drives a predetermined liquid crystal cell. Each thin film transistor 22 compensates for a DC voltage level shift. The gate of the thin film transistor 21 is connected to the scan bus line 11' ($S_i$). The gate of the thin film transistor 22 is connected to the scan bus line 12' ($S_{i-1}$) that drives a column just above the scan bus line 11' ($S_i$) to which the gate of the thin film transistor 21 in question is connected. The drains (or sources) of the thin film transistors 21 and 22 are connected to the display electrode 3 (liquid crystal cell $P_i$), and the sources (or drains) of the thin film transistors 21 and 22 are connected to the reference potential supplying bus lines 4. The thin film transistor 22 compensates for a potential fluctuation occurring in the display electrode after the gate of the thin film transistor 21 is selected. These transistors are operated by address and compensation pulses of a drive waveform on the scan bus line. This arrangement realizes a high yield because the bus lines never intersect one another on the TFT substrate, and displays excellent images with no afterimage because there is no DC voltage level shift.

Figure 4:
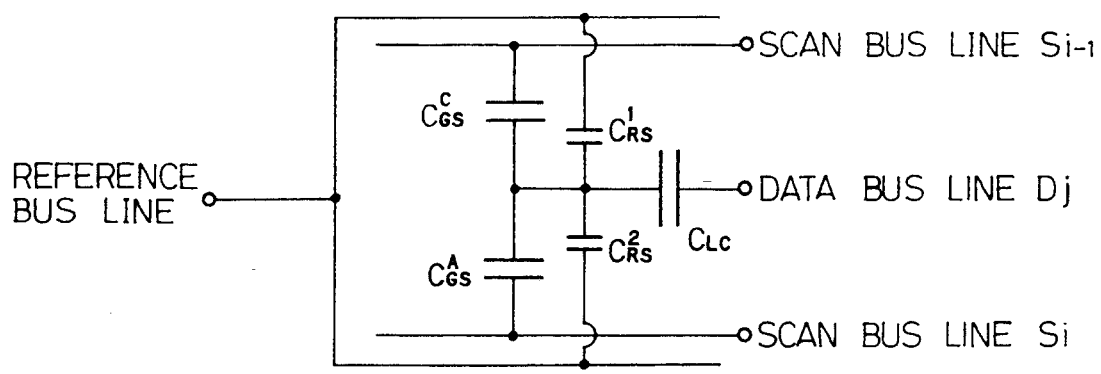
FIG. 4 is a diagram showing an equivalent circuit of the active matrix liquid crystal display apparatus of FIG. 3.

FIG. 4 shows an equivalent circuit of the active matrix liquid crystal display apparatus of FIG. 3. As shown in the figure, the TFT (thin film transistor 21) serving as a normal address transistor has a capacitance of $C_{GS}^A$, and the TFT (thin film transistor 22) serving as a DC voltage level shift compensation transistor has a capacitance of $C_{GS}^C$. Then, a compensation voltage $V_C$ is expressed as follows:

$$V_C = (C_{GS}^A \cdot V_A)/C_{GS}^C$$

The magnitude of cross talk occurring in the opposed matrix display apparatus when data is written in another display cell while the TFT in question is OFF during a storage period is proportional to a coupling constant $\alpha$ $$\alpha = (C_{GS}^C + C_{GS}^A + C_{LC})/(C_{LC} + C_{GS}^C + C_{GS}^A + C_{RS})$$

Accordingly, if the compensation capacitance is increased to lower the compensation voltage, the cross talk will enlarge accordingly, thereby making it impossible to display excellent natural color images.

Below, the preferred embodiments of an active matrix display apparatus according to the present invention will be explained, with reference to the accompanying drawings.

Figure 5A:
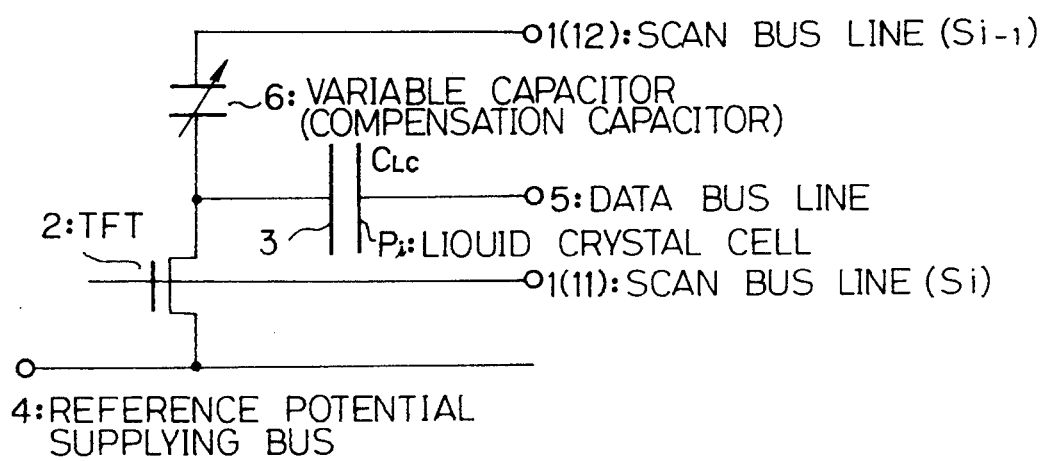

FIGS. 5A to 5C show a principle of an active matrix liquid crystal display apparatus according to the present invention.

In FIG. 5A, the opposed active matrix liquid crystal display apparatus according to the present invention employs two substrates that are arranged opposite to each other with a liquid crystal layer interposed between them. One of the substrates has a plurality of scan bus lines 1, thin film transistors 2, display electrodes 3, and reference potential supplying bus lines 4. The gate of the thin film transistor 2 is connected to the scan bus line 1. One of either the source or the drain of the transistor is connected to the display electrode 3, and the other is connected to the reference potential supplying bus line 4. The other of the two substrates has a plurality of stripe-like data bus lines 5 facing the display electrodes 3. To compensate for a potential fluctuation occurring in the display electrode after the gate of the thin film transistor 2 is selected, the display electrode 3 is provided with a variable compensation capacitor (compensation capacitor) 6.

The variable compensation capacitor 6 provided for each display electrode 3 of the active matrix liquid crystal display apparatus according to the present invention compensates for a potential fluctuation occurring in the display electrode after the gate of the thin film transistor 2 is selected.

In FIGS. 5B and 5C, the capacitance of the variable compensation capacitor 6 of the active matrix liquid crystal display apparatus according to the present invention increases during a period Tb for compensating a DC voltage level shift and decreases during a storage period Ta other than the period Tb. During the period Ta, the gate of the thin film address transistor 2 is not selected. Since the variable compensation capacitor 6 has a large capacitance during the compensation period Tb, it can reduce the compensation voltage. On the other hand, the capacitor 6 acts as a small parasitic capacitor during the storage period Ta, to suppress cross talk and display natural color images with sufficient gradations.

In this way, the active matrix liquid crystal display apparatus according to the present invention employs variable capacitors for compensating DC voltage level shifts. The capacitance of each of the capacitors increases during the compensation period Tb, to lower the compensation voltage, and decreases during the storage period Ta, to suppress cross talk.

Figure 6:
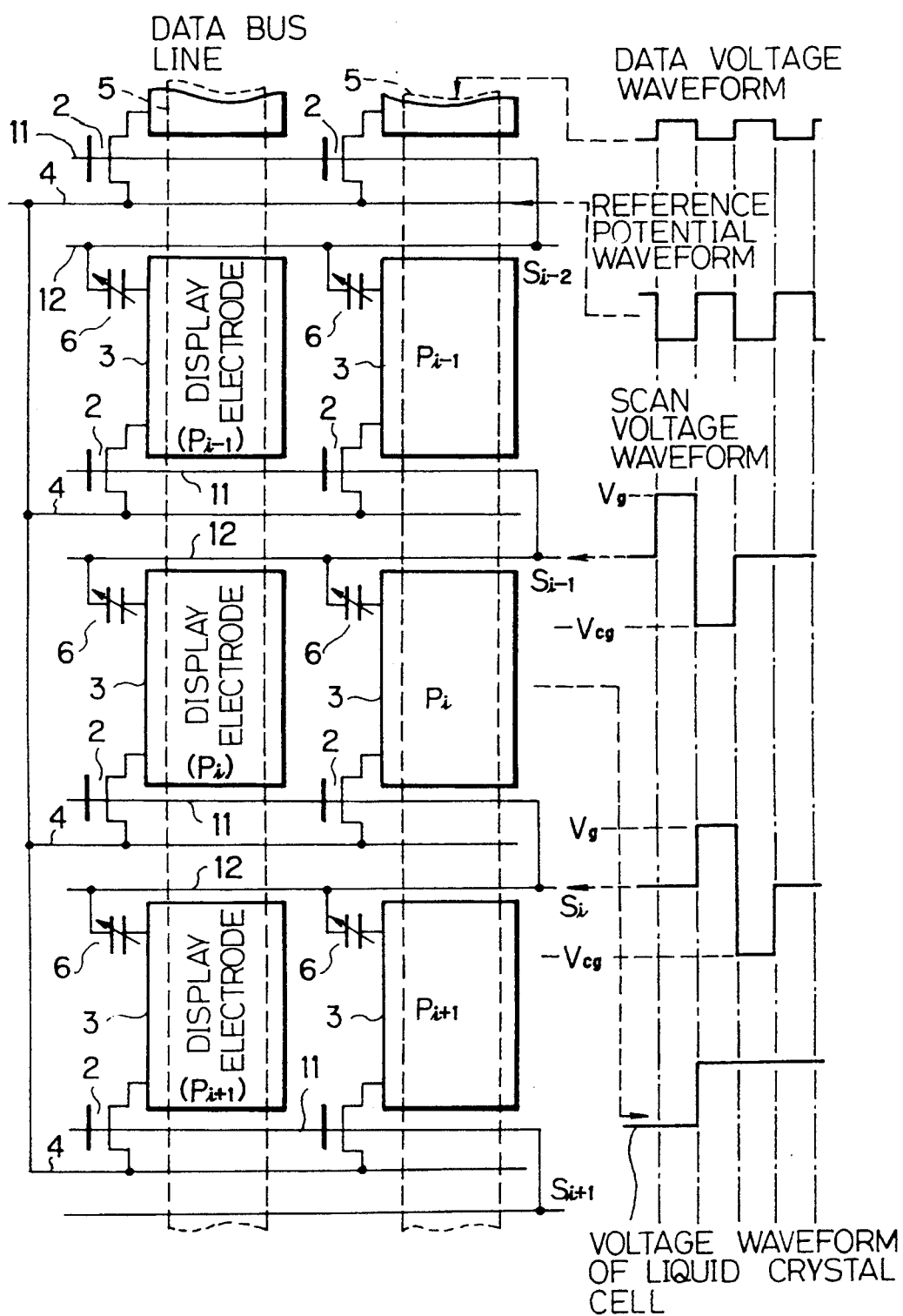
FIG. 6 is a diagram showing a basic arrangement of the active matrix liquid crystal display apparatus according to the first aspect of the present invention.

FIG. 6 shows the basic arrangement of the active matrix liquid crystal display apparatus, or patterns on one substrate of the opposed active matrix liquid crystal display apparatus according to the first aspect of the present invention.

In FIG. 6, the active matrix liquid crystal display apparatus comprises two substrates facing each other with a liquid crystal layer between them. One (TFT substrate 89 of FIG. 1) of the substrates has a plurality of scan bus lines 11 and 12, thin film transistors 2, display electrodes 3, reference potential supplying bus lines 4, and variable compensation capacitors 6. The other (opposite substrate 80 of FIG. 1) of the two substrates has a plurality of stripe-like data bus lines 5 facing the display electrodes 3. Each pair of the scan bus lines 11 and 12 are arranged in parallel formation on each side of the corresponding reference potential supplying bus line 4. The reference potential supplying bus lines 4 are commonly connected and switched to one of two different levels at, for example, horizontal scan intervals.

The thin film transistor 2 selectively drives a predetermined liquid crystal cell. The variable compensation capacitor 6 compensates for a DC voltage level shift. The gate of the thin film transistor 2 is connected to the scan bus line 11 ($S_i$). One terminal of the variable compensation capacitor 6 is connected to the scan bus line 12 ($S_{i-1}$) for driving a column above the scan bus line 11 ($S_i$) to which the gate of the thin film transistor 2 in question is connected. The drain (or source) of the thin film transistor 2 is connected to the display electrode 3 (liquid crystal cell $P_i$), and the source (or drain) of the thin film transistor 2 is connected to the reference potential supplying bus line 4. The other terminal of the variable compensation capacitor 6 is connected to the display electrode 3 (liquid crystal cell $P_i$).

Figure 7:
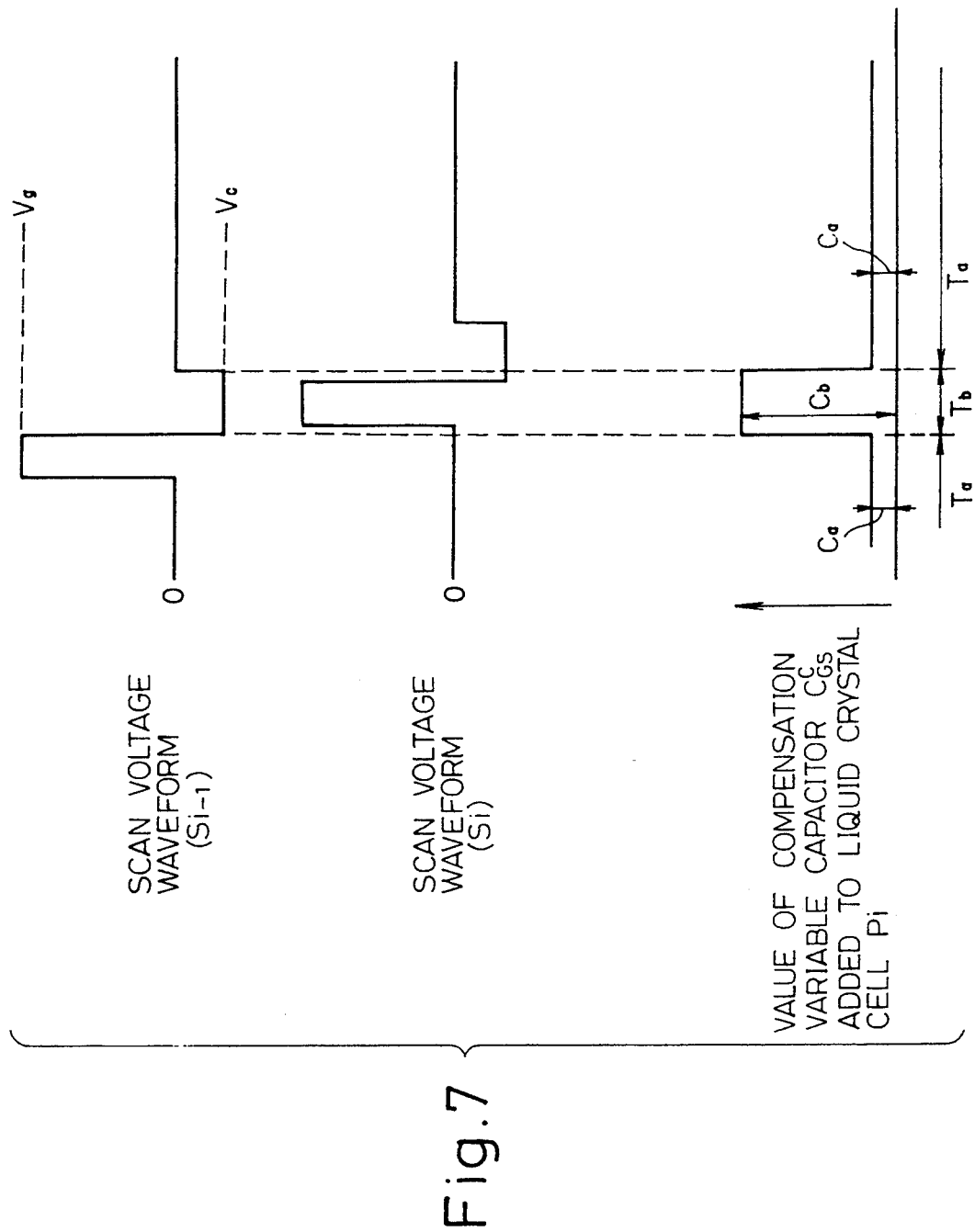
FIG. 7 is a timing chart of the active matrix liquid crystal display apparatus of FIG. 6.

FIG. 7 is a timing chart of the active matrix liquid crystal display apparatus of FIG. 6. The figure shows a voltage waveform on the scan bus line $S_{i-1}$ (the scan bus line 12 to which one terminal of the variable compensation capacitor 6 connected to the display electrode 3 of each liquid crystal cell $P_i$ is connected) for driving the liquid crystal cells $P_{i-1}$ in a column i−1, a voltage waveform on the scan bus line $S_i$ (the scan bus line 11 to which the gate of the thin film transistor 2 connected to the display electrode 3 of each liquid crystal cell $P_i$ is connected) for driving the liquid crystal cells $P_i$ in a column i, and the capacitance of the variable compensation capacitor 6.

As shown in FIG. 7, the voltage waveform on the scan bus line $S_i$ for driving the liquid crystal cells $P_i$ in the column i has the same shape as the voltage waveform on the scan bus line $S_{i-1}$ for driving the liquid crystal cells $P_{i-1}$ in the column i−1 but is delayed by a predetermined time (determined by a clock signal). Namely, drive signals for respective columns in the active matrix liquid crystal display apparatus are sequentially selected and changed to predetermined levels according to the clock signal. The capacitance ($C_{GS}^C$) of the variable compensation capacitor 6 is large during a period Tb to compensate for a DC voltage level shift, and small in the other period (a storage period Ta during which the gate of the thin film address transistor 2 is not selected). Namely, as shown in the figure, the capacitance $C_{GS}^C$ of the variable compensation capacitor 6 is variably controlled to be Cb during the compensation period Tb and Ca during the storage period Ta.

When a scan voltage is applied to the scan bus line $S_{i-1}$, the display electrode 3 of each of the liquid crystal cells $P_{i-1}$ is connected to the reference potential supplying bus line 4 through the thin film transistor 2, so that a differential voltage (a data voltage) between the data bus line 5 and the reference potential supplying bus line 4 is applied to the corresponding liquid crystal cell $P_{i-1}$. Until the column (i−1) is selected next time, every liquid crystal cell $P_{i-1}$ holds the data voltage for displaying a predetermined image. During the storage period Ta of the liquid crystal cells $P_{i-1}$, the capacitance $C_{GS}{}^c$ of the variable compensation capacitor 6 connected to the display electrode 3 of any one of the liquid crystal cells $P_{i-1}$ is Ca, which is small, so that the liquid crystal cells $P_{i-1}$ are substantially not affected by data voltages (cross talk) of the other lines.

When a scan voltage is applied to the scan bus line $S_i$, the display electrode 3 of each of the liquid crystal cells $P_i$ is connected to the reference potential supplying bus line 4 through the thin film transistor 2, and a differential voltage (a data voltage) between the data bus line 5 and the reference potential supplying bus line 4 is applied to the corresponding liquid crystal cell $P_i$. Until the column (i) is selected next time, every liquid crystal cell $P_i$ holds the data voltage to display a predetermined image. During the compensation period Tb (a storage period for the cells except the liquid crystal cells $P_i$) for the liquid crystal cells $P_i$, the capacitance $C_{GS}{}^c$ of the variable compensation capacitor 6 connected to the display electrode 3 of any one of the liquid crystal cells $P_i$ is Cb which is large, so that a DC voltage level shift of the liquid crystal cell $P_i$ is sufficiently compensated. This means that a compensation voltage for compensating the DC voltage level shift can be lowered.

Each pair of the scan bus lines 11 and 12 are arranged in parallel formation on each side of the corresponding reference potential supplying bus line 4. The gate of the thin film transistor 2 of the liquid crystal cell $P_i$ is connected to the scan bus line 11 ($S_i$). One terminal of the variable compensation capacitor 6 of the liquid crystal cell $P_i$ is connected to the scan bus line 12 ($S_{i-1}$). This arrangement can be modified in various ways.

Figure 8A:
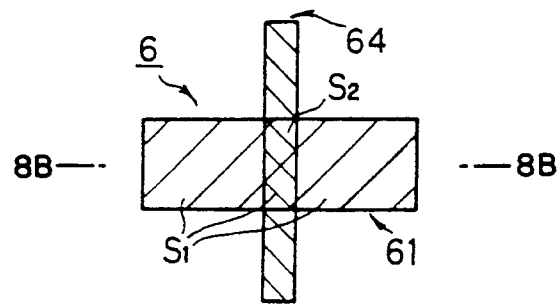
FIGS. 8A to 8C are diagrams showing an example of a variable capacitor of the active matrix liquid crystal display apparatus according to the present invention.
Figure 8B:
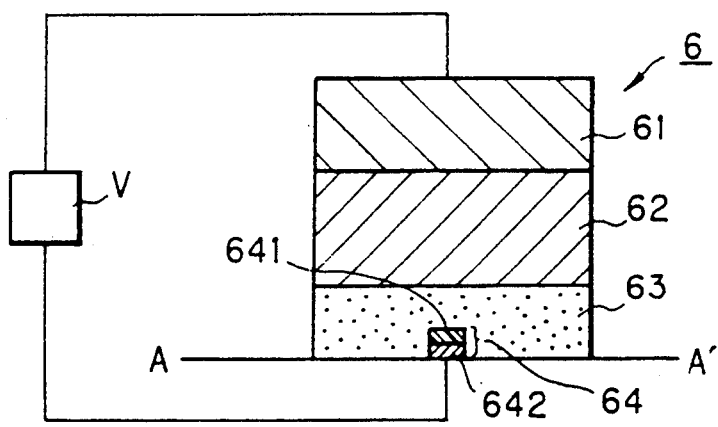
Figure 8C:
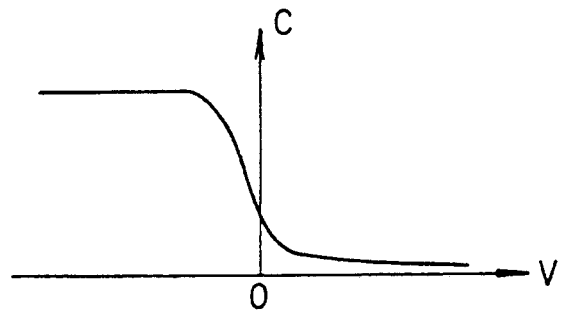

FIGS. 8A to 8C show an example of a variable capacitor of the active matrix liquid crystal display apparatus according to the present invention. Note, FIG. 8A is a plan view, FIG. 8B is a sectional view taken along a line 8B—8B of FIG. 8A, and FIG. 8C is an explanatory diagram operation of the capacitor. The arrangement of FIGS. 8A to 8C is applicable for the variable compensation capacitor 6 of the active matrix liquid crystal display apparatus of FIG. 6.

In FIGS. 8A and 8B, the variable compensation capacitor 6 has a laminated MIS structure comprising, from the top to the bottom in FIG. 8B, an upper electrode 61, an insulation layer 62, a semiconductor layer 63, and a lower electrode 64. The lower electrode 64 comprises an ohmic contact portion 641 that is electrically connected to the semiconductor layer 63, and an electrode portion 642. A power source voltage V is applied between the upper electrode 61 and the electrode portion 642 of the lower electrode 64.

In FIG. 8A, an area $S_i$ where the upper electrode 61 overlaps the semiconductor layer 63 is larger than an area $S_2$ where the upper electrode 61 overlaps the lower electrode 64. When the upper electrode 61 receives a negative (−) voltage and the electrode portion 642 of the lower electrode 64 receives a positive (+) voltage, the capacitance of the variable compensation capacitor 6 may be increased if the semiconductor layer 63 is made of p-type semiconductor material (for example, p-type amorphous silicon), and the ohmic contact portion 641 of the lower electrode 64 is made of P+-type semiconductor material (for example, P+-type amorphous silicon).

More precisely, when the upper electrode 61 receives a positive voltage and the lower electrode 64 (electrode portion 642) a negative voltage, the capacitance of the variable compensation capacitor 6 is determined by the area $S_2$ where the upper electrode 61 overlaps the lower electrode 64. On the other hand, when the upper electrode 61 receives a negative voltage and the lower electrode 64 a positive voltage, the capacitance of the variable compensation capacitor 6 is determined by the area $S_i$ where the upper electrode 61 overlaps the semiconductor layer 63. When the electrode portion 642 of the lower electrode 64 receives a positive voltage, holes (positive holes) spread over the semiconductor layer 63 through the ohmic contact portion 641 made of P+-type semiconductor material. As a result, the capacitance is formed between the upper electrode 61 and the semiconductor layer 63 (the area $S_1$).

As shown in FIG. 8C, when the power source voltage V is positive (with the upper electrode 61 receiving positive potential and the lower electrode 64 negative potential), the capacitance of the variable compensation capacitor 6 is small because of the area $S_2$ where the upper electrode 61 overlaps the lower electrode 64. On the contrary, when the power source voltage V is negative (with the upper electrode 61 receiving negative potential and the lower electrode 64 positive potential), the capacitance of the variable compensation capacitor 6 is large because of the area $S_1$ where the upper electrode 61 overlaps the semiconductor layer 63.

In this way, the capacitance of the variable compensation capacitor 6 of the active matrix liquid crystal display apparatus according to the present invention is controlled by a voltage (the polarities of the applied voltage) in such a way that the capacitance during the compensation period (Tb) is larger than that during the storage period (Ta).

The semiconductor layer 63 may be made of n-type semiconductor material, and the ohmic contact portion 641 of the lower electrode 64 of N+-type semiconductor material. In this case, the capacitance of the variable compensation capacitor 6 with the lower electrode 64 (the electrode portion 642) receiving a negative voltage is determined by the area $S_1$ where the upper electrode 61 overlaps the semiconductor layer 63. When the upper electrode 61 receives a negative voltage and the lower electrode 64 a positive voltage, the capacitance of the variable compensation capacitor 6 is determined by the area $S_2$ where the upper electrode 61 overlaps the lower electrode 64. Namely, when a negative voltage is applied to the electrode portion 642 of the lower electrode 64, electrons spread over the semiconductor layer 63 through the ohmic contact portion 641 made of N+-type semiconductor material, so that capacitance is formed between the upper electrode 61 and the semiconductor layer 63 (the area $S_1$).

The variable compensation capacitor shown in FIGS. 8A to 8C has the laminated MIS structure comprising, from the top to the bottom, the upper electrode, insulation layer, semiconductor layer, and lower electrode. The variable compensation capacitor may have a laminated MIS structure comprising, from the top to the bottom, an upper electrode, a semiconductor layer, an insulation layer, and a lower electrode. In the former case, the area where the upper electrode overlaps the semiconductor layer is made larger than the area where the upper electrode overlaps the lower electrode. In the latter case, the area where the semiconductor layer overlaps the lower electrode is made larger than the area where the upper electrode overlaps the lower electrode. A bus line that controls a compensation voltage of the variable compensation capacitor 6 may be the scan bus line (12) or the reference potential supplying bus line 4.

In this way, the variable compensation capacitor used for the active matrix liquid crystal display apparatus of the present invention has the MIS structure comprising, from the bottom to the top, the lower electrode, insulation layer, semiconductor layer, and upper electrode (or the lower electrode, semiconductor layer, insulation layer, and upper electrode). The area where the semiconductor layer overlaps the electrode on the insulation layer side is made larger than the area where the lower electrode overlaps the upper electrode. This structure is capable of controlling capacitance more than a variable range of the MIS capacitance. Namely, normal MIS capacitance stands when the capacity of a depletion layer in the direction of lamination of the semiconductor layer changes in response to an applied voltage. On the other hand, the capacitance (variable compensation capacitance) can be expanded by controlling an applied voltage that controls effective electrode areas ($S_1$ and $S_2$) in a planar direction. When a voltage is applied to establish a accumulation state of the semiconductor layer, the conductance of the semiconductor layer increases, and an effective electrode area of the variable capacitor becomes substantially equal to the area ($S_1$) where the semiconductor layer overlaps the electrode on the insulation layer side. On the other hand, when a voltage is applied to establish a depletion state of the semiconductor layer, the conductance of the semiconductor layer decreases so that the effective electrode area of the variable capacitor becomes substantially equal to the area ($S_2$) where the upper electrode overlaps the lower electrode.

When the variable compensation capacitor 6 is used for the active matrix liquid crystal display apparatus, a compensation voltage applied must be opposite to a gate voltage of the thin film address transistor 2. Accordingly, to provide large compensation capacitance with respect to the compensation voltage applied, the electrode of the variable compensation capacity 6 on the semiconductor layer side is connected to the display electrode 3 when a sign of charges induced in the semiconductor layer 62 of the variable compensation capacitor 6 during the compensation period (Tb) differs from a sign of carriers produced when the gate of the thin film transistor 2 is selected. When a sign of charges induced in the semiconductor layer 62 of the variable compensation capacitor 6 during the compensation period (Tb) is the same as a sign of carriers produced when the gate of the thin film transistor 2 is selected, the electrode of the variable compensation capacitor 6 on the insulation layer side is connected to the display electrode 3.

FIGS. 9A~9C to 12A~12C are diagrams explaining manufacturing processes of the active matrix liquid crystal display apparatus according to a first embodiment of the present invention. In FIGS. 9A~9C to 12A~12C, the variable compensation capacitor comprises a laminated structure of, from the bottom to the top, a lower electrode, a semiconductor layer, an insulation layer, and an upper electrode. A sign of charges (holes) induced in the semiconductor layer 63 of the variable compensation capacitor 6 during the compensation period (Tb) differs from a sign of carriers (electrons) produced when the gate of the thin film transistor 2 is selected. The structure of the variable compensation capacitor 6 is the same as that shown in FIGS. 8A to 8C.

Figure 10A:
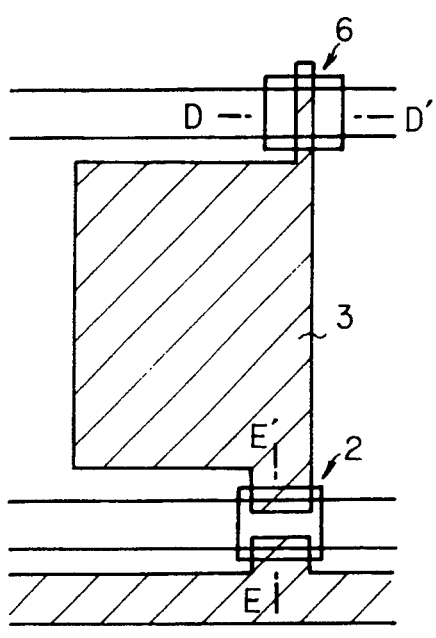
Figure 10B:
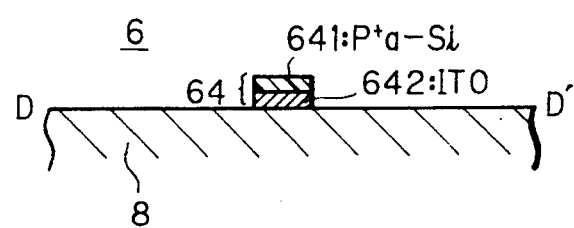

In FIGS. 9A to 9C, an ITO serving as a transparent electrode is formed on a glass substrate 8 (TFT substrate) to a thickness of 50 nm by sputtering. As shown in FIG. 9C, N+a-Si (amorphous silicon) serving as an ohmic contact layer (the source 21 and drain 22) of the thin film address transistor 2 is formed to a thickness of 30 nm by plasma CVD (Chemical Vapor Deposition). Predetermined resist patterns (preliminary source and drain patterns) are formed by resist 90, and only the N+a-Si is etched according to the resist patterns. In FIG. 9C, P+a-Si serving as the ohmic contact layer (641) of the electrode (lower electrode 64) on the semiconductor layer side of the variable compensation capacitor 6 is formed to a thickness of 30 nm by plasma CVD with the resist 90 being left as it is. Thereafter, the lower electrode 64 having the ohmic contact portion 641 and electrode portion 642 (FIGS. 8B and 10B) is formed by lift-off.

Figure 10C:
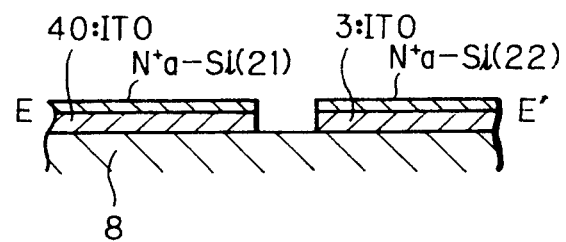
Figure 11A:
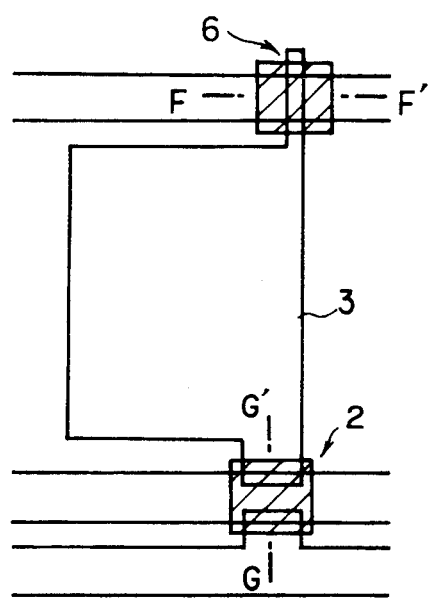
Figure 11B:
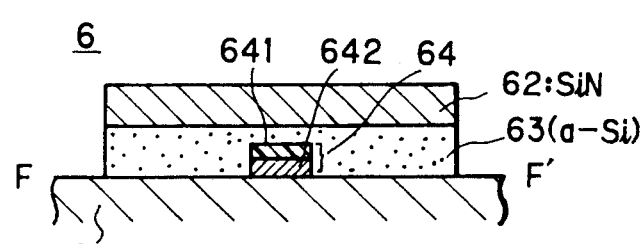
Figure 11C:
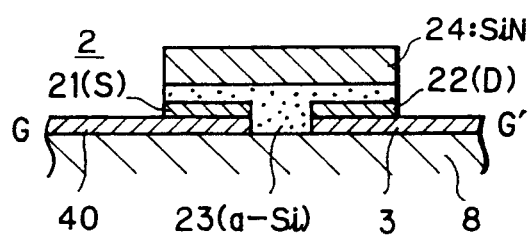

As shown in FIG. 10C, the source electrode (21) and drain electrode (22) of the thin film transistor 2 are patterned. In FIGS. 11B and 11C, the plasma CVD method is used to form a-Si 30 nm in thickness serving as the semiconductor layer 63 of the variable compensation capacitor 6 and the semiconductor layer 23 of the thin film transistor 2, as well as forming SiN 50 nm in thickness serving as a first insulation layer (a gate insulation film layer) indicated as 62 and 24. Thereafter, as shown in FIGS. 12B and 12C, SiN 250 nm in thickness is formed as a second insulation layer gate insulation film layer) 9 (62, 24), and contact holes are patterned. Al (aluminum) is sputtered, and the scan bus lines 11 and 12 and reference potential supplying bus line 4 are patterned.

Reference numeral 3 denotes a display electrode made of the ITO, and 40 denotes a conductor portion made of the ITO for connecting the source 21 of the thin film transistor 2 with the reference potential supplying bus line 4. A part of the scan bus line 11 is used as the gate 25 of the thin film transistor 2, and a part of the scan bus line 12 is used as the upper electrode 61 of the variable compensation capacitor 6. The lower electrode 642 of the variable compensation capacitor 6 is connected to the display electrode 3.

Voltages of waveforms of FIG. 7 are applied to the scan bus lines $S_{i-1}$ (12) and $S_i$ (11) of the active matrix liquid crystal display apparatus formed. The capacitance of each variable compensation capacitor 6 increases during the compensation period (Tb) to compensate for a DC voltage level shift of the corresponding liquid crystal cell, and decreases during the storage period (Ta) to suppress cross talk.

FIGS. 13A~13C to 15A~15C are diagrams explaining manufacturing processes of an active matrix liquid crystal display apparatus according to a second embodiment of the present invention. Note, a variable compensation capacitor (compensation capacitor) of this embodiment comprises a laminated structure of, from the bottom to the top, a lower electrode, a semiconductor layer, an insulation layer, and an upper electrode. A sign of charges induced in the semiconductor layer 163 of the variable compensation capacitor 106 during the compensation period (Tb) is equal to a sign of carriers (electrons) produced when the gate of a thin film transistor 102 is selected.

Figure 13A:
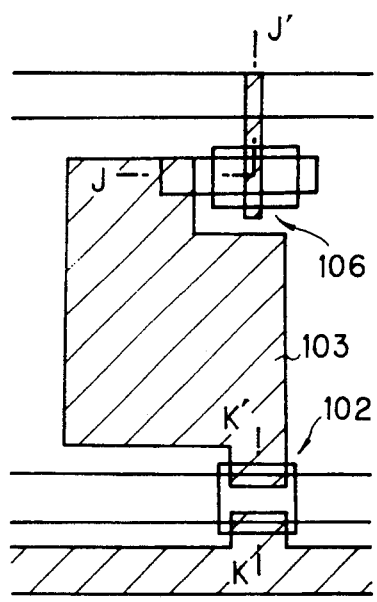
FIGS. 13A~13C to 15A~15C are diagrams explaining manufacturing processes of an active matrix liquid crystal display apparatus according to a second embodiment of the present invention.
Figure 13B:
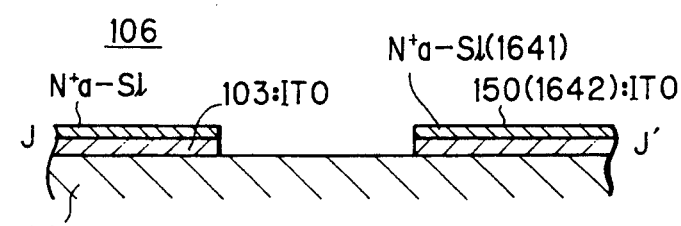
Figure 13C:
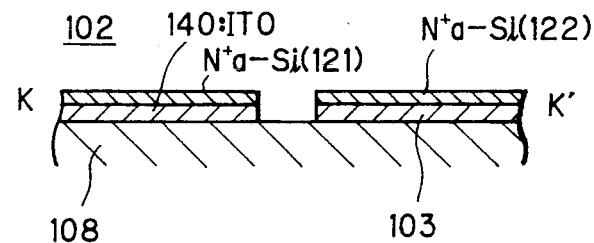
Figure 14A:
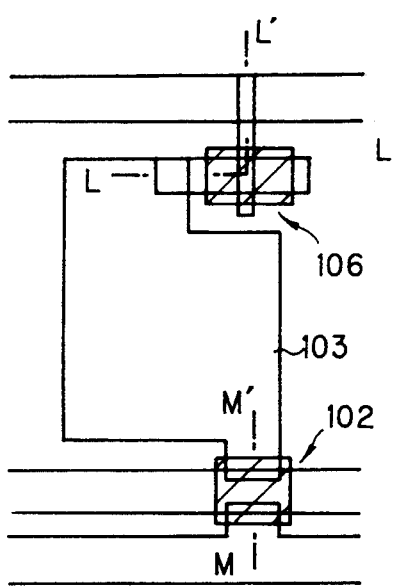
Figure 14B:
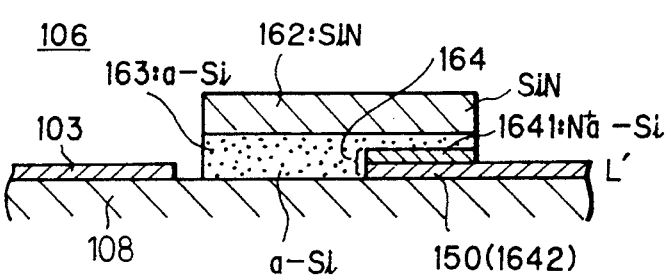
Figure 14C:
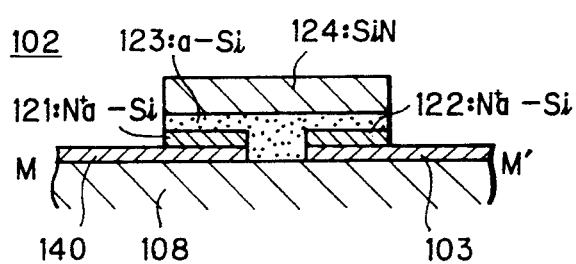
Figure 15A:
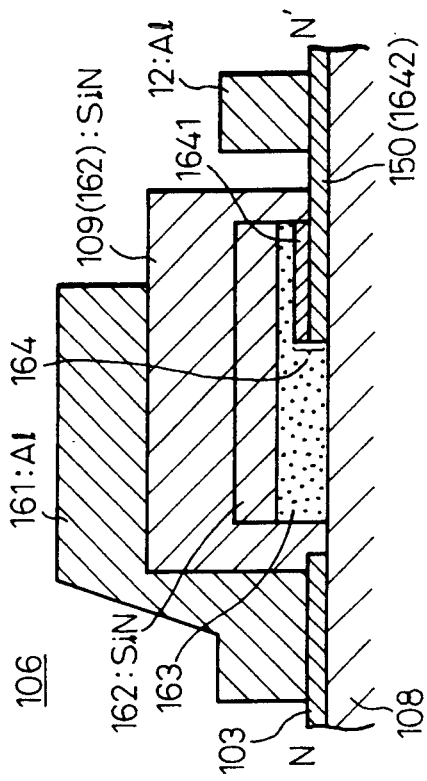
Figure 15B:
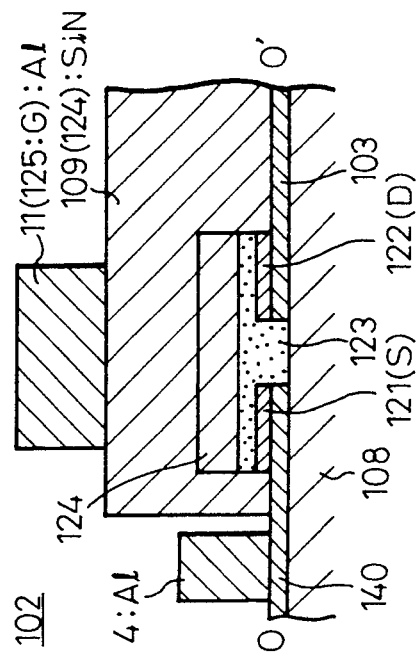
Figure 15C:
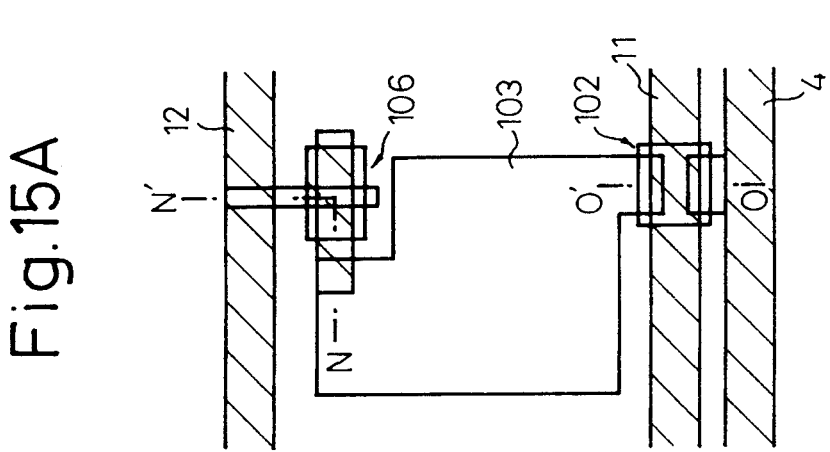

As shown in FIGS. 13A to 13C, an ITO 50 nm in thickness serving as a transparent electrode is formed on a glass substrate 108 (a TFT substrate) by sputtering. In FIGS. 13B and 13C, N+a-Si (amorphous silicon) 30 nm in thickness serving as an ohmic contact layer of the thin film address transistor 102 and of the variable compensation capacitor 106 by plasma CVD. Thereafter, a source electrode (121) and drain electrode (122) of the thin film transistor 2 and an ohmic contact layer (ohmic contact portion 1641) of the semiconductor layer side electrode (lower electrode 164) of the variable compensation capacitor 106 are patterned. In FIGS. 14B and 14C, the plasma CVD method is used to form a-Si 30 nm in thickness serving as the semiconductor layer 163 of the variable compensation capacitor 106 and a semiconductor layer 123 of the thin film transistor 102, as well as forming SiN 50 nm in thickness serving as a first insulation layer (a gate insulation film layer) indicated as 162 and 124. Then, the elements are separated from one another by patterning. As shown in FIGS. 15B and 15C, SiN 250 nm in thickness is formed as a second insulation layer (a gate insulation film layer) 109 (162, 124), and contact holes are patterned. Al (aluminum) is sputtered, and scan bus lines 11 and 12, reference potential supplying bus line 4, and the upper electrode 161 of the variable compensation capacitor 106 are patterned.

Reference numeral 103 denotes a display electrode made of the ITO, 140 denotes a conductor portion made of the ITO for connecting the source 121 of the thin film transistor 102 with the reference potential supplying bus line 4, and 150 denotes a conductor portion made of the ITO integral with an electrode portion 1642 of the lower electrode 164 of the variable compensation capacitor 106, for connecting the ohmic contact portion 1641 of the lower electrode 164 with the scan bus line 12. A part of the scan bus line 11 is used as a gate 125 of the thin film transistor 102. The upper electrode 161 of the variable compensation capacitor 106 is connected to the display electrode 103.

Voltage of waveforms of FIG. 7 are applied to the scan bus lines $S_{i-1}$ (12) and $S_i$ (11) of the active matrix liquid crystal display apparatus formed. As explained with reference to FIGS. 9A~9C to 12A~12C, the capacitance of each variable compensation capacitor 6 increases during the compensation period (Tb) to compensate for a DC voltage level shift of the corresponding liquid crystal cell, and decreases during the storage period (Ta) to suppress cross talk.

As explained above in detail, the present invention provides an active matrix liquid crystal display apparatus that employs variable compensation capacitors for compensating DC voltage level shifts, to decrease compensation voltages and suppress cross talk. The active matrix liquid crystal display apparatus according to the present invention, therefore, can be produced at a low cost and is capable of displaying excellent natural color images.

Figure 16:
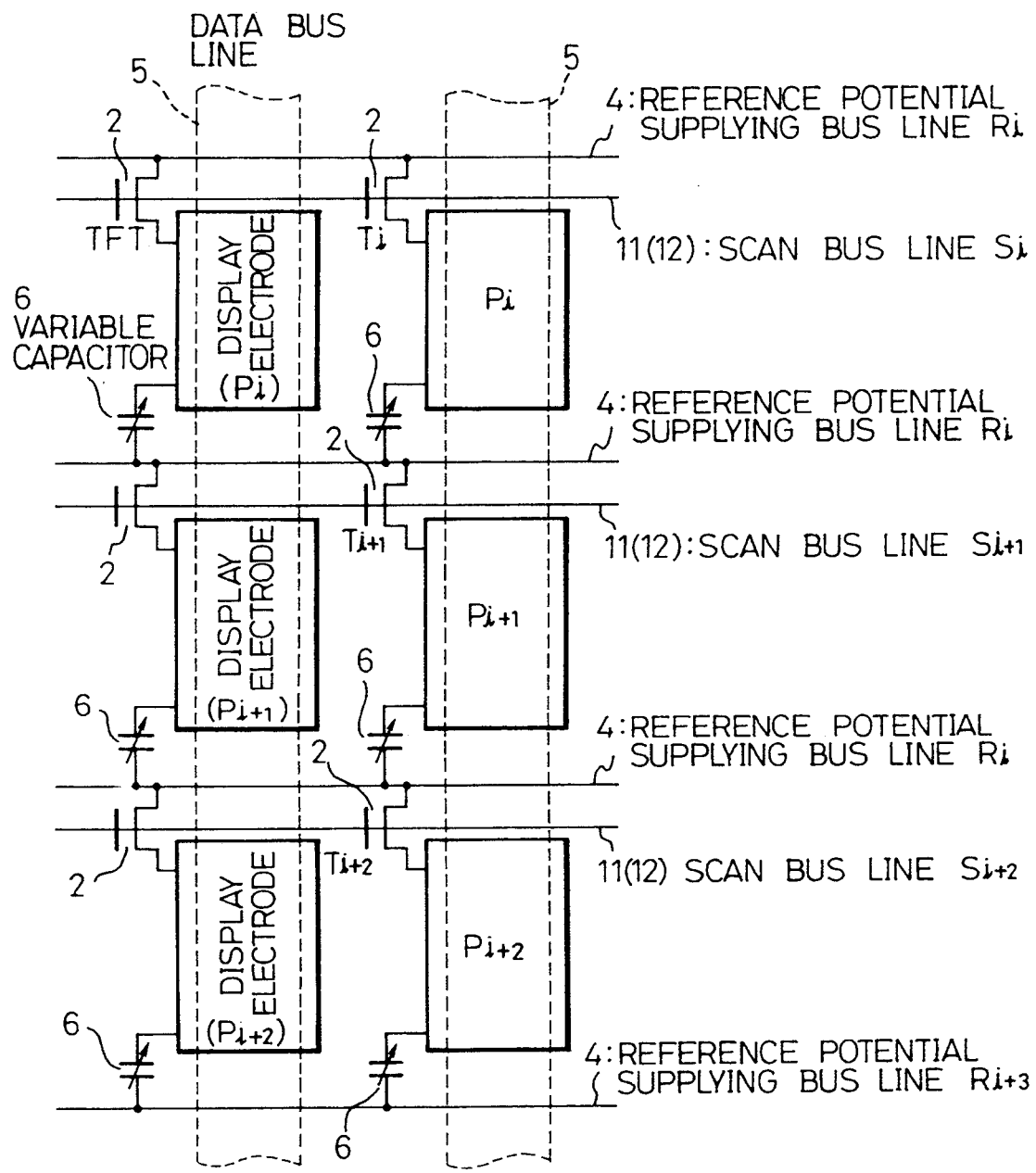
FIG. 16 is a diagram showing a modification of the basic arrangement of the active matrix liquid crystal display apparatus shown in FIG. 6.

FIG. 16 shows a modification of the basic arrangement of the active matrix liquid crystal display apparatus shown in FIG. 6.

As shown in FIG. 16, the active matrix liquid crystal display apparatus comprises two substrates facing each other with a liquid crystal layer between them. One (TFT substrate 89 of FIG. 1) of the substrates has a plurality of scan bus lines 11, thin film transistors 2, display electrodes 3, reference potential supplying bus lines 4, and variable compensation capacitors 6. The other (opposite substrate 80 of FIG. 1) of the two substrates has a plurality of stripe-like data bus lines 5 facing the display electrodes 3.

By comparing the configuration of FIG. 6 with that of FIG. 16, the active matrix liquid crystal display apparatus of FIG. 6 includes two types of scan bus lines 11 and 12 for the thin film transistor 2 and variable compensation capacitor 6, but the active matrix liquid crystal display apparatus of FIG. 16 includes only one type of scan bus line 11 for the thin film transistor 2. Namely, one terminal of the variable compensation capacitor 6 is connected to the reference potential supplying bus line 4 to which the source (or drain) of the thin film transistor 2 is connected. Note, the other terminal of the variable compensation capacitor 6 is connected to the display electrode 3 (liquid crystal cell $P_i$), and the drain (or source) of the thin film transistor 2 is connected to the adjacent display electrode 3 (liquid crystal cell $P_{i+1}$). Namely, in the active matrix liquid crystal display apparatus of FIG. 16, the scan bus lines 12 for the variable compensation capacitors 6 can be omitted. Consequently, an occupied area of the liquid crystal cell can be enlarged, and the brightness of the display can be increased. The other configurations of the active matrix liquid crystal display apparatus shown in FIG. 16 are the same as that shown in FIG. 6.

Figure 17:
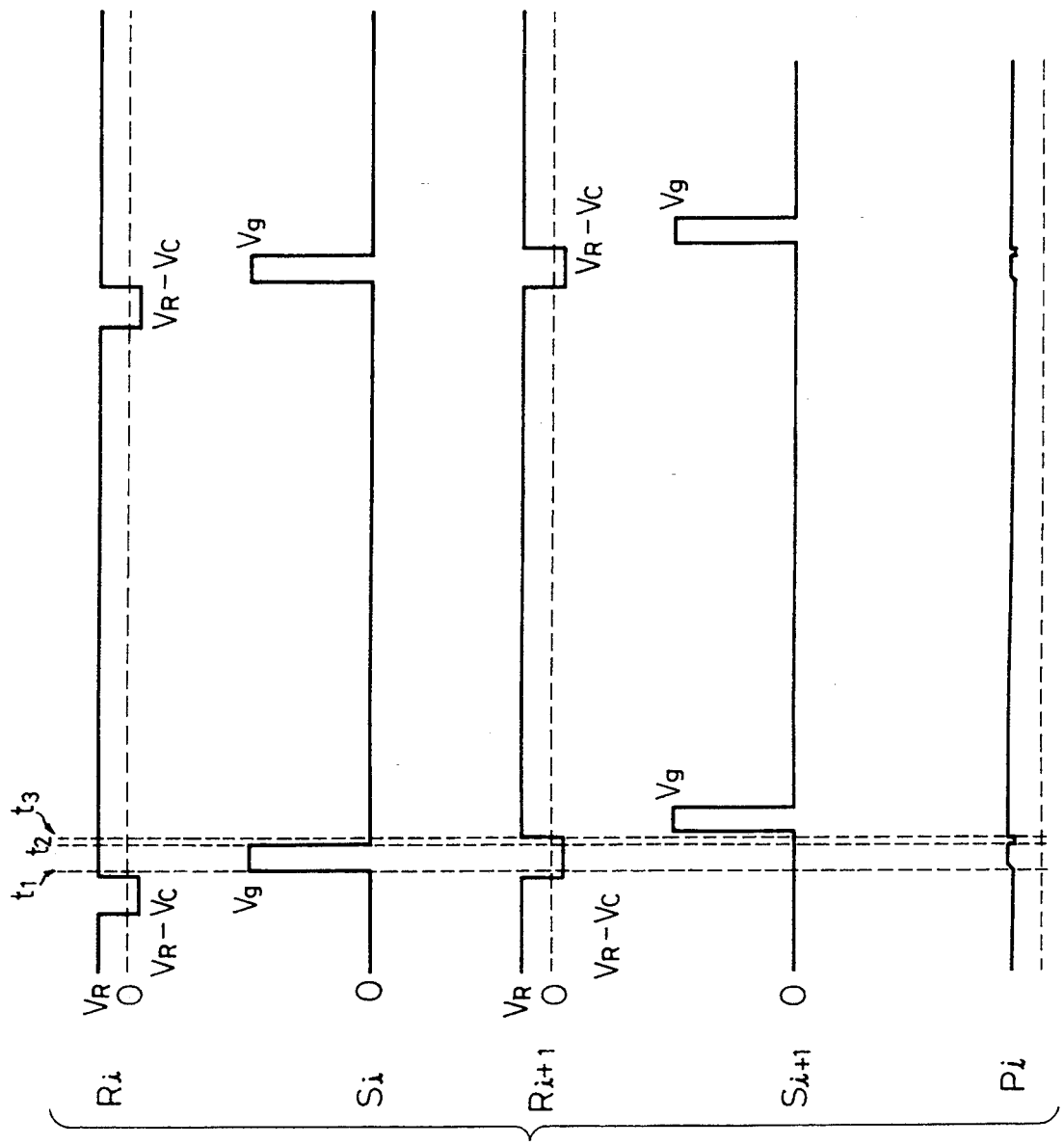
FIG. 17 is a timing chart of the active matrix liquid crystal display apparatus of FIG. 16.

FIG. 17 is a timing chart of the active matrix liquid crystal display apparatus of FIG. 16. Note, FIG. 17 shows voltage waveforms on the reference potential supplying bus lines $R_i$, $R_{i+1}$ (4), the scan bus lines $S_1$, $S_{1+1}$ (12), and the display electrode $P_i$ (3).

As shown in FIG. 17, the reference potential supplying bus lines $R_i$, $R_{i+1}$ are changed between the potentials of $V_R$ and $V_R-V_C$, and the scan bus lines $S_i$, $S_{i+1}$ are changed between the potentials of $V_G$ and zero. During $t_1 < t < t_2$, a high potential $V_G$ is applied to the scan bus lines $S_i$ (12), the thin film transistor $T_i$ (2) is switched ON, and a high potential $V_R$ applying to the reference potential supplying bus line 4 is applied (or written) to the display electrode $P_i$ (3). Note, when $t < t_2$, a potential $(V_R - V_c) - V_R = -V_C$ is applied to the variable compensation capacitors 6, and the capacitance of the variable compensation capacitors 6 becomes a large value (Cb).

Therefore, a DC voltage level shift of the display electrode $P_i$ (3) when $t = t_2$, can be compensated for by the coupling of the variable compensation capacitor 6 which is caused by a change in the voltage of the reference potential supplying bus lines $R_{i+1}$ (4) when $t = t_3$. Note, when $t > t_3$, or during a storage period, zero volts are applied to the variable compensation capacitors 6, the capacitance of the variable compensation capacitors 6 becomes a small value (Ca), and the cross talk can be reduced. Namely, the capacitance of the variable compensation capacitor 6 is large during a period (Tb) for compensating for a DC voltage level shift, and is small in a storage period (Ta). Consequently, during the storage period Ta, the capacitance of the variable compensation capacitor 6 connected to the display electrode 3 is Ca which is small, so that the liquid crystal cells $P_i$ are substantially not affected by data voltages (cross talk) of the other lines. Further, during the compensation period Tb, the capacitance of the variable compensation capacitor 6 connected to the display electrode 3 is Cb which is large, so that a DC voltage level shift is sufficiently compensated.

Note, in the above descriptions, according to the active matrix liquid crystal display apparatuses according to the first aspect of the present invention, the compensation capacitor can be formed by using the same processes for constituting the conventional active matrix liquid crystal display apparatuses.

FIGS. 18A to 18C show a principle of an active matrix liquid crystal display apparatus according to a second aspect of the present invention.

In FIG. 18A, the opposed active matrix liquid crystal display apparatus according to the present invention employs two substrates that are arranged opposite each other with a liquid crystal layer interposing between them. One of the substrates has a plurality of scan bus lines 1, thin film transistors 2, display electrodes 3, and reference potential supplying bus lines 4. The gate of the thin film transistor 2 is connected to the scan bus line 1. One of either the source or the drain of the thin film transistor is connected to the display electrode 3, and the other is connected to the reference potential supplying bus line 4. The other of the two substrates has a plurality of stripe-like data bus lines 5 facing the display electrodes 3. Each of the display electrodes 3 is provided with a compensation capacitor 306 (6) made of a ferroelectric thin film. Spontaneous polarization in the ferroelectric thin film of the compensation capacitor (306) is inverted when or just after the gate of the thin film transistor is selected, thereby compensating for a potential fluctuation occurring in the display electrode after the gate of the thin film transistor is selected.

The compensation capacitor 306 provided for each display electrode 3 of the active matrix liquid crystal display apparatus according to the present invention compensates for a potential fluctuation occurring in the display electrode after the gate of the thin film transistor 2 is selected. Spontaneous polarization in the ferroelectric thin film of the compensation capacitor 306 is inverted when or just after the gate of the thin film transistor 2 is selected, thereby compensating for the potential fluctuation in the display electrode occurring after the gate of the thin film transistor 2 is selected.

In this way, according to the active matrix liquid crystal display apparatus of the present invention, each of the display electrodes 3 is provided with the compensation capacitor 306 made of a ferroelectric thin film, and the spontaneous polarization of the ferroelectric thin film is inverted to compensate for a DC voltage level shift. When the magnitude of the spontaneous polarization per unit area of the ferroelectric thin film is Ps, the quantity of charges induced by the inversion of the spontaneous polarization will be 2PsS (where S is the area of the compensation capacitor 306). The DC voltage level shift occurs when the gate selection is completed because charges of $-C_{GS}^{4*} V_A$ are effectively induced at the display electrode. Accordingly, the DC voltage level shift will be compensated for if the compensation capacitor 306 is designed to satisfy the following:

$$2PsS = C_{GS}^{4*} V_A$$

In the ferroelectric thin film (ferroelectric material), the quantity of charges induced by the spontaneous polarization is large, so that the compensation capacitor may have a small element area to sufficiently compensate for the DC voltage level shift.

During a storage period in which the gate of the thin film transistor 2 is not selected, the compensation capacitor 306 may induce charges with respect to voltage fluctuations, similar to a normal ferroelectric material. The quantity of these charges can be very small compared with the quantity of charges induced by a conventional compensation capacitor, because the compensation capacitor 306 has a small element area. Accordingly, the present invention can reduce cross talk.

The active matrix liquid crystal display apparatus of the present invention similarly carries out compensation for the next frame. Accordingly, it is necessary to reset the direction of the spontaneous polarization to the original direction. As shown in FIG. 18C, this resetting is carried out by applying, just before the corresponding thin film transistor 2 is selected, a pulse that is opposite to the pulse for the compensation operation. Since the compensation capacitor is reset just before the thin film transistor 2 is selected, a fluctuation of the spontaneous polarization in the ferroelectric thin film of the compensation capacitor 306 caused by the reset operation will not substantially influence an effective voltage applied to the liquid crystal.

As explained above, the active matrix liquid crystal display apparatus according to the present invention additionally employs a compensation capacitor made of a ferroelectric thin film for each display electrode. Spontaneous polarization of the ferroelectric thin film is inverted to compensate for a DC voltage level shift. Compensation capacitance of the capacitor is large during the period for compensating the DC voltage level shift, and small in the other period (a storage period in which the gate of a corresponding thin film address transistor is not selected). In this way, the active matrix liquid crystal display apparatus of the present invention compensates for the DC voltage level shift, thus suppressing cross talk, realizing a high yield, reducing costs, and providing a large screen that displays natural color images.

Active matrix liquid crystal display apparatuses according to embodiments of the present invention will be explained with reference to drawings.

Figure 19:
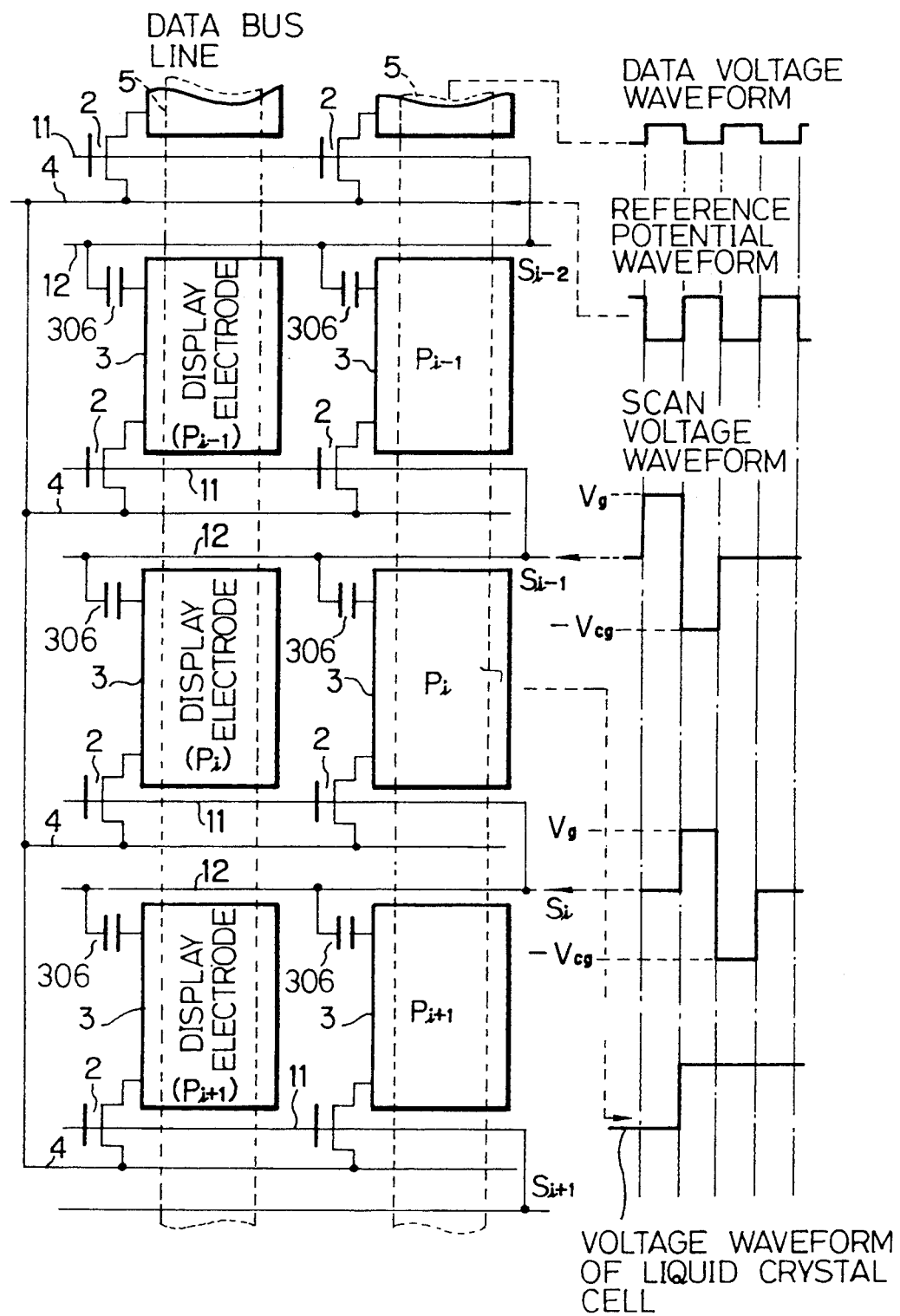
FIG. 19 is a diagram showing a basic arrangement of the active matrix liquid crystal display apparatus according to the second aspect of the present invention.

FIG. 19 shows a basic arrangement of the active matrix liquid crystal display apparatus according to the second aspect of the present invention.

In FIG. 19, the active matrix liquid crystal display apparatus comprises two substrates facing each other with a liquid crystal layer between them. One (TFT substrate 89 of FIG. 1) of the substrates has a plurality of scan bus lines 11 and 12, thin film transistors 2, display electrodes 3, reference potential supplying bus lines 4, and compensation capacitors 306 (6). The other (opposite substrate 80 in FIG. 1) of the two substrates has a plurality of stripe-like data bus lines 5 facing the display electrodes 3. Each pair of scan bus lines 11 and 12 are arranged in parallel formation on each side of the corresponding reference potential supplying bus line 4. The reference potential supplying bus lines 4 are commonly connected and switched to one of the two different levels at, for example, horizontal scan intervals.

The thin film transistor 2 selectively drives a predetermined liquid crystal cell. The compensation capacitor 306 compensates for a DC voltage level shift. The gate of the thin film transistor 2 is connected to the scan bus line 11 ($S_i$). One terminal of the compensation capacitor 306 is connected to the scan bus line 12 ($S_{i-1}$) for driving a column above the scan bus line 11 ($S_i$) to which the gate of the thin film transistor 2 in question is connected. The drain (or source) of the thin film transistor 2 is connected to the display electrode 3 (liquid crystal cell $P_i$), and the source (or drain) of the thin film transistor 2 is connected to the reference potential supplying bus line 4. The other terminal of the compensation capacitor 306 is connected to the display electrode 3 (liquid crystal cell $P_i$). The compensation capacitor 306 comprises two electrodes and a ferroelectric thin film held between the electrodes.

Figure 20:
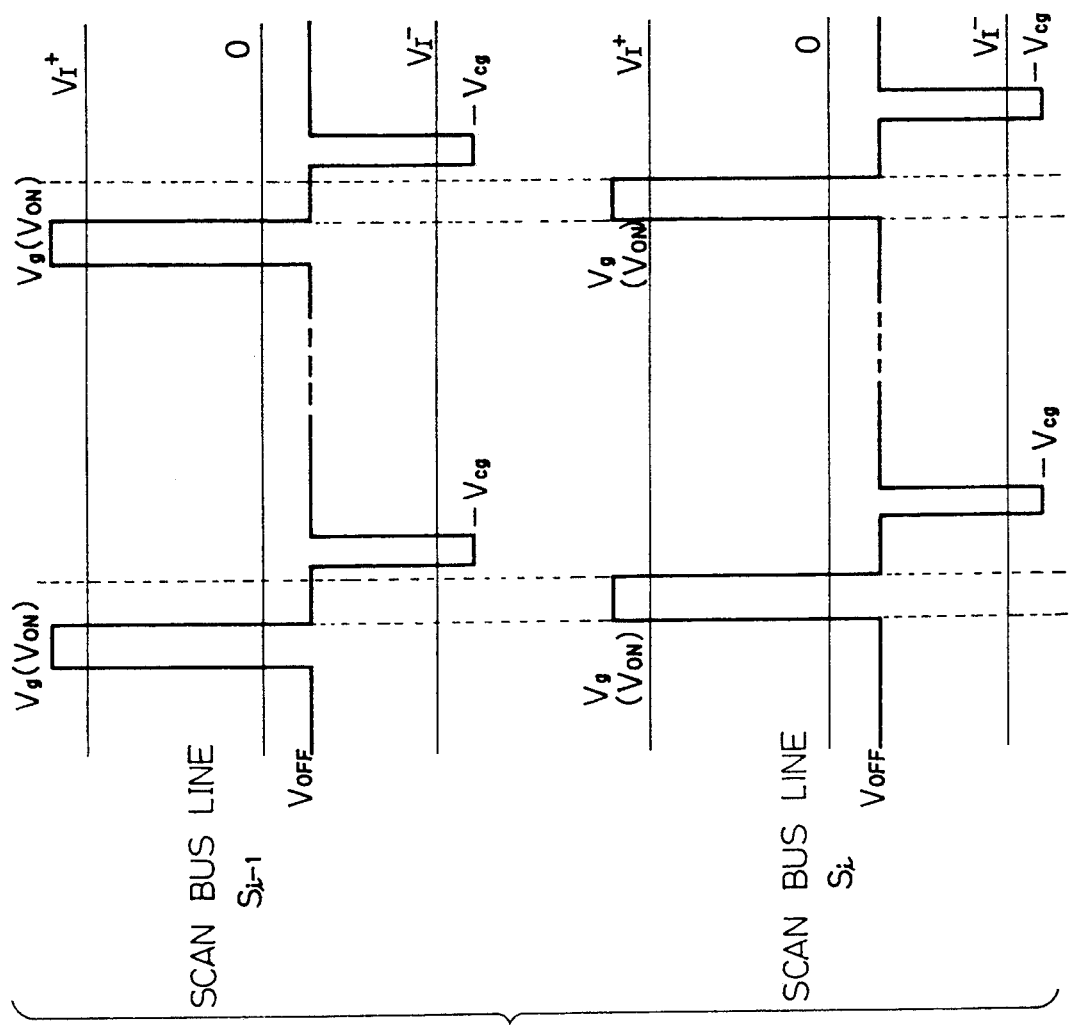
FIG. 20 is a timing chart of the active matrix liquid crystal display apparatus of FIG. 19.

FIG. 20 is a timing chart of the active matrix liquid crystal display apparatus of FIG. 19. The figure shows a voltage waveform on the scan bus line $S_{i-1}$, (the scan bus line 12 to which one terminal of the compensation capacitor 306 connected to the display electrode 3 of each liquid crystal cell $P_i$ is connected) for driving the liquid crystal cells $P_{i-1}$ in a column i−1, and a voltage waveform on the scan bus line $S_i$ (the scan bus line 11 to which the gate of the thin film transistor 2 connected to the display electrode 3 of each liquid crystal cell $P_i$ is connected) for driving the liquid crystal cells $P_i$ in a column i. FIGS. 21A to 21C explains the compensation capacitor of the active matrix liquid crystal display apparatus of the present invention.

As shown in FIG. 20, the voltage waveform on the scan bus line $S_i$ for driving the liquid crystal cells $P_i$ in the column i has the same shape as the voltage waveform on the scan bus line $S_{i-1}$, for driving the liquid crystal cells $P_{i-1}$, in the column i−1 but is delayed from the same by a predetermined time (determined by a clock signal). Namely, drive signals for respective columns in the active matrix liquid crystal display apparatus are sequentially selected and changed to predetermined levels according to the clock signal. The voltage waveform on the scan bus line $S_{i-1}$ for driving the liquid crystal cells $P_{i-1}$, in the column i−1 reaches a voltage Vg ($V_{ON}$) just before the scan bus line $S_i$ for driving the liquid crystal cells $P_i$ in the column i rises to the ON voltage Vg ($V_{ON}$), and is inverted to a negative voltage −Vcg just after the scan bus line $S_i$ falls to an OFF voltage $V_{OFF}$. Namely, the scan bus line $S_{i-1}$ gets the voltage Vg just before the scan bus line $S_i$ rises to the 0N voltage Vg. This voltage is used not only for driving the thin film transistor 2 of the liquid crystal cells $P_{i-1}$, in the column i−1 but also for resetting the spontaneous polarization of the ferroelectric materials of the compensation capacitors 306. When the scan bus line $S_{i-1}$ reaches the voltage −Vcg just after the scan bus line $S_i$ falls to the OFF voltage $V_{OFF}$, the spontaneous polarization of the ferroelectric materials of the compensation capacitors 306 is inverted to compensate for DC voltage level shifts of the liquid crystal cells $P_i$ occurring when the gates of the thin film transistors are selected.

As shown in FIG. 21C, the voltage Vg is higher than a positive coercive force $V_I^+$ of the ferroelectric material of the compensation capacitor 306 (6), and the voltage −Vcg is lower than a negative coercive force $V_I^-$ of the ferroelectric material of the compensation capacitor 306. Accordingly, the polarization (spontaneous polarization) of the ferroelectric material of the compensation capacitor 306 is inverted when the voltages Vg and −Vcg are applied to the compensation capacitor 306.

When the scan bus line $S_{i-1}$ receives the voltage Vg that is higher than the positive coercive force $V_I^+$, the ferroelectric material of the compensation capacitor 306 connected to the liquid crystal cell $P_i$ induces positive spontaneous polarization (residual polarization) Ps, as shown in FIG. 21A, through BB on a hysteresis curve of FIG. 21C. When the scan bus line $S_i$ receives the voltage Vg under this state, the thin film transistor 2 is switched ON to select the liquid crystal cell $P_i$ to which predetermined data is written.

Just after the scan bus line $S_i$ falls to the voltage $V_{OFF}$, the scan bus line $S_{i-1}$ reaches the voltage −Vcg that is lower than the negative coercive force $V_I^-$. As a result, the ferroelectric material of the compensation capacitor 306 induces negative spontaneous polarization −Ps, as shown in FIG. 21B, through AA on the hysteresis curve of FIG. 21C. Namely, the spontaneous polarization of the ferroelectric material of the compensation capacitor 306 is inverted to induce charges of 2 PsS in quantity (where S is the area of the compensation capacitor 306).

As explained above, when the scan bus line $S_i$ falls to the voltage $V_{OFF}$, each corresponding thin film transistor 2 is switched OFF (upon completion of gate selection), and a DC voltage level shift (charges of $-C_{GS}^{4*} V_A$) occurs when the gate selection is completed. According to the active matrix liquid crystal display apparatus of the embodiment, the DC voltage level shift is compensated for by the charges of 2 PsS induced by the inversion of the spontaneous polarization of the ferroelectric material of the compensation capacitor 306. The spontaneous polarization of the ferroelectric material of the compensation capacitor 306 is reset when the scan bus line $S_{i-1}$ receives the voltage Vg just before the liquid crystal cells $P_i$ are driven. The resetting is done at this time because a fluctuation in the spontaneous polarization of the ferroelectric thin film of the compensation capacitor 306 caused by the resetting does not substantially influence an effective voltage applied to the liquid crystal cells if the resetting is done just before the thin film transistors 2 are selected.

The capacitance of the compensation capacitor 306 is approximately equal to that of a normal capacitor (or smaller than the same because the size of the compensation capacitor is smaller than a normal size), except when the spontaneous polarization is inverted, to thereby prevent cross talk. In addition, a DC voltage level shift in each liquid crystal cell $P_i$ is compensated for by charges of 2 PsS induced by inverting the spontaneous polarization of the ferroelectric material (ferroelectric thin film) of the compensation capacitor 306 of the active matrix liquid crystal display apparatus of the embodiment. The compensation capacitor 306, therefore, may have a small element area. which helps reduce the compensation voltage for compensating the DC voltage level shift.

Each pair scan bus lines 11 and 12 are arranged in parallel formation on each side of the corresponding reference potential supplying bus line 4. The gate of the thin film transistor 2 of the liquid crystal cell $P_i$ is connected to the scan bus line 11 ($S_i$). One terminal of the compensation capacitor 306 of the liquid crystal cell $P_i$ is connected to the scan bus line 12 ($S_{i-1}$). This arrangement can be modified in various ways.

FIGS. 22A∼22C to 25A∼25C are diagrams explaining manufacturing processes of the active matrix liquid crystal display apparatus according to a third embodiment of the present invention.

In FIGS. 22A to 22C, an ITO serving as a transparent electrode is formed on a glass substrate 8 (TFT substrate) with a thickness of 50 nm by sputtering. As shown in FIG. 22C, N+a-Si (amorphous silicon) serving as an ohmic contact layer (the source 21 and drain 22) of the thin film address transistor 2 is formed with a thickness of 30 nm by plasma CVD. Predetermined resist patterns are formed, and the N+a-Si and ITO are etched according to the resist patterns to form the source electrode 21 and drain electrode 22 of the thin film transistor 2. As shown in FIG. 22B, one electrode 361 of the compensation capacitor 306 integral with the display electrode 3 of the liquid crystal cell is formed from the transparent electrode (ITO). During this process, N+a-Si 362 is formed on the electrode 361.

Figure 25A:
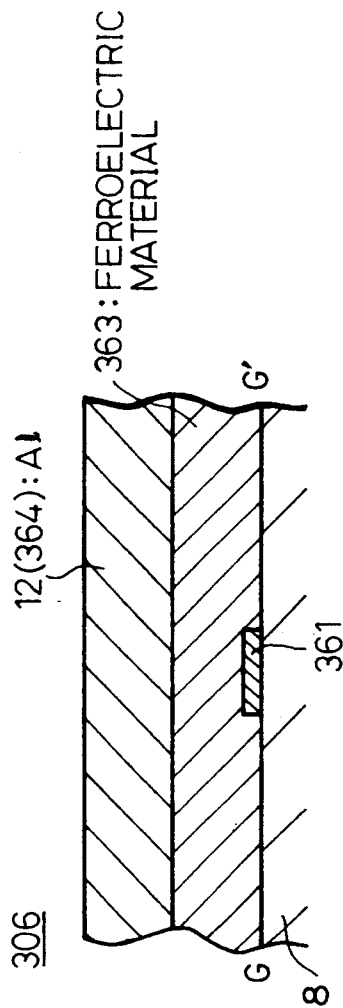
Figure 25B:
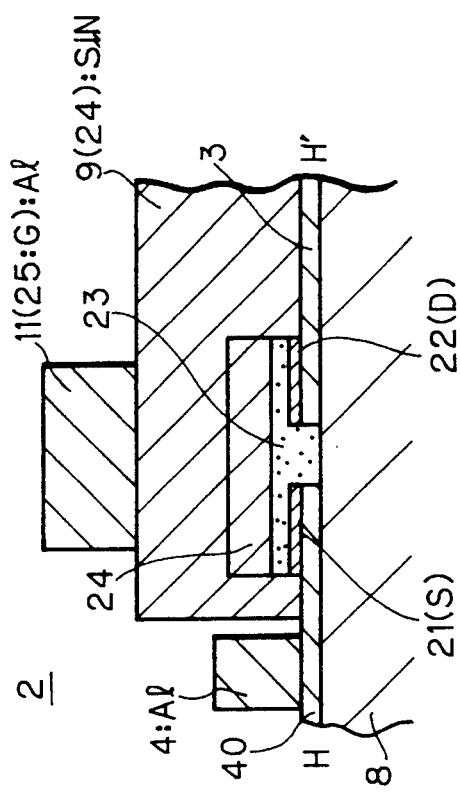
Figure 25C:
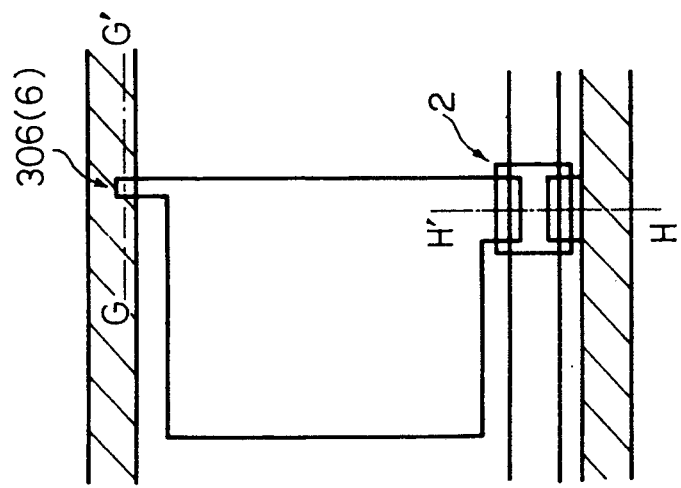

In FIGS. 23A to 23C, a-Si serving as a semiconductor layer 23 of the thin film transistor 2 is formed by plasma CVD to a thickness of 30 nm. SiN 50 nm in thickness serving as a first insulation layer (gate insulation film layer) 24 is formed by plasma CVD. Thereafter, elements are separated from one another by patterning. In FIG. 24C, SiN 250 nm in thickness serving as a second insulation layer (gate insulation film layer) 9 (24) is formed, and contact holes are patterned. In FIGS. 25A to 25C, Al (aluminum) is sputtered, and the scan bus line 11 and reference potential supplying bus line 4 are patterned. Reference numeral 40 denotes a conductor portion made of the ITO for connecting the source 21 of the thin film transistor 2 with the reference potential supplying bus line 4. A part of the scan bus line 11 is used as the gate 25 of the thin film transistor 2.

The compensation capacitor 306 will be explained. In FIGS. 23B and 24B, the electrode 361 is formed on the glass substrate 8. In FIG. 25B, the ferroelectric thin film 363 is formed, and the scan bus line 12 (364) is patterned. The ferroelectric layer 363 is formed by spin-coating a copolymer of VDF (vinylidene fluoride) and TrFE (trifluoroethylene) to a thickness of 150 nm, annealing it at 145 degrees centigrade, and slowly cooling the same. The ferroelectric layer is patterned to leave the compensation element (compensation capacitor) 306. Al (aluminum) is sputtered, and the scan bus line 12 is patterned. As a result, the control bus line (364) of the compensation capacitor 306 is connected to the scan bus line simultaneously formed. A part of the scan bus line 12 is used as the upper electrode 364 of the compensation capacitor 306. The lower electrode 361 of the compensation capacitor 306 is connected to the display electrode 3.

Voltages of waveforms shown in FIG. 20 are applied to the scan bus lines $S_{i-1}$ (12) and $S_i$ (11) of the active matrix liquid crystal display apparatus formed. The capacitance of the compensation capacitor 306 effectively increases during a compensation period to compensate for a DC voltage level shift of the liquid crystal cell, and decreases during a storage period to suppress cross talk.

As explained above in detail, the present invention provides an active matrix liquid crystal display apparatus that employs a compensation capacitor made of a ferroelectric thin film for each display electrode, to compensate for a DC voltage level shift by inverting spontaneous polarization of the ferroelectric thin film. The active matrix liquid crystal display apparatus according to the present invention, therefore, can compensate for the DC voltage level shift with the compensation capacitor having a small element area, suppress cross talk, realize a large screen at a low cost, achieve a high yield, and display excellent color images. Further, according to the active matrix liquid crystal display apparatuses according to the second aspect of the present invention, the compensation capacitor can be formed by a small area. Concretely, an occupied area of the compensation capacitor having the thin film transistor of the related art is, for example, 5 $\mu m \times 20$ $\mu m$, or 10 $\mu m \times 40$ $\mu m$, but an occupied area of the compensation capacitor made of a ferroelectric thin film is, for example, 2 $\mu m \times 3$ $\mu m$, or 3 $\mu m \times 3$ $\mu m$. Therefore, the display electrode can be formed large, and the brightness of the display apparatus can be increased.

Many widely differing embodiments of the present invention may be constructed without departing from the spirit and scope of the present invention, and it should be understood that the present invention is not limited to the specific embodiments described in this specification, except as defined in the appended claims.

We claim:

1. An active matrix liquid crystal display apparatus comprising:

first and second substrates disposed in facing relationship and a liquid crystal layer therebetween;

said first substrate having associated therewith a plurality of first and second scan bus lines, thin film transistors, display electrodes and reference potential supplying bus lines, each of said thin film transistors being respectively associated with corresponding ones of said first and second scan bus lines and reference potential supplying bus lines and with a corresponding display electrode and having a gate electrode connected to said associated first scan bus line, a source electrode connected to one of either said associated display electrode or said associated reference potential supplying bus line, and a drain electrode connected to the other of either said associated display electrode or said associated reference potential supplying bus line and said thin film transistor being controlled by said associated first scan bus line;

said second substrate having a plurality of stripe-like data bus lines disposed thereon so as to face said display electrodes; and each of said display electrodes having a corresponding compensation capacitor which compensates for a potential fluctuation occurring in said corresponding display electrode after the gate electrode of said thin film transistor is selected, said compensation capacitor being controlled by said second scan bus line such that the capacitance of said compensation capacitor has a larger value during a compensation period than the value thereof during a storage period in which the gate electrode of said corresponding thin film transistor is not selected.

2. An active matrix liquid crystal display apparatus as claimed in claim 1, wherein the capacitance of said compensation capacitor is controlled by a voltage.

3. An active matrix liquid crystal display apparatus as claimed in claim 1, wherein said first and second scan bus lines are disposed in parallel formation on each side of said reference potential supplying bus line, and said second scan bus line receives a signal for controlling said display electrodes that are located adjacent to said first scan bus line.

4. An active matrix liquid crystal display apparatus as claimed in claim 1, wherein said scan bus line or said reference potential supplying bus line serves as a compensation voltage controlling electrode bus line for controlling a compensation voltage of said compensation capacitor.

5. An active matrix liquid crystal display apparatus as claimed in claim 1, wherein said compensation capacitor has a laminated structure comprising, from the top to the bottom, an upper electrode, an insulation layer, a semiconductor layer, and a lower electrode, and wherein an area where said upper electrode overlaps said semiconductor layer is larger than an area where said upper electrode overlaps said lower electrode.

6. An active matrix liquid crystal display apparatus as claimed in claim 5, wherein said lower electrode adjacent to said semiconductor layer comprises an electrode portion and an ohmic contact portion in contact with the adjacent semiconductor layer, and carriers induced at said ohmic contact portion control charges induced in said semiconductor layer.

7. An active matrix liquid crystal display apparatus as claimed in claim 5, wherein said semiconductor layer is an amorphous silicon layer used to fabricate said thin film transistors.

8. An active matrix liquid crystal display apparatus as claimed in claim 5, wherein said scan bus line or said reference potential supplying bus line serves as a compensation voltage controlling electrode bus line for controlling a compensation voltage of said compensation capacitor, and during said compensation period, a sign of charges induced in said semiconductor layer of said compensation capacitor differs from a sign of carriers produced when the gate electrode of said thin film transistor is selected, and wherein said lower electrode of said compensation capacitor is connected to said display electrode, and said upper electrode thereof is connected to said compensation voltage controlling electrode bus line.

9. An active matrix liquid crystal display apparatus as claimed in claim 5, wherein said scan bus line or said reference potential supplying bus line serves as a compensation voltage controlling electrode bus line for controlling a compensation voltage of said compensation capacitor, and during said compensation period, a sign of charges induced in said semiconductor layer of said compensation capacitor is the same as a sign of carriers produced when the gate electrode of said thin film transistor is selected, and wherein said upper electrode of said compensation capacitor is connected to said display electrode, and said lower electrode thereof is connected to said compensation voltage controlling electrode bus line.

10. An active matrix liquid crystal display apparatus as claimed in claim 1, wherein said compensation capacitor has a laminated structure comprising, from the top to the bottom, an upper electrode, a semiconductor layer, an insulation layer, and a lower electrode, and wherein an area where said semiconductor layer overlaps said lower electrode is larger than an area where said upper electrode overlaps said lower electrode.

11. An active matrix liquid crystal display apparatus as claimed in claim 10, wherein said upper electrode adjacent to said semiconductor layer comprises an electrode portion and an ohmic contact portion in contact with the adjacent semiconductor layer, and carriers induced at said ohmic contact portion control charges induced in said semiconductor layer.

12. An active matrix liquid crystal display apparatus as claimed in claim 10, wherein said semiconductor layer is an amorphous silicon layer used to fabricate said thin film transistors.

13. An active matrix liquid crystal display apparatus as claimed in claim 10, wherein said scan bus line or said reference potential supplying bus line serves as a compensation voltage controlling electrode bus line for controlling a compensation voltage of said compensation capacitor, and during said compensation period, a sign of charges induced in said semiconductor layer of said compensation capacitor differs from a sign of carriers produced when the gate electrode of said thin film transistor is selected, and wherein said upper electrode of said compensation capacitor is connected to said display electrode, and said lower electrode thereof is connected to said compensation voltage controlling electrode bus line.

14. An active matrix liquid crystal display apparatus as claimed in claim 10, wherein said scan bus line or said reference potential supplying bus line serves as a compensation voltage controlling electrode bus line for controlling a compensation voltage of said compensation capacitor, and during said compensation period, a sign of charges induced in said semiconductor layer of said compensation capacitor is the same as a sign of carriers produced when the gate electrode of said thin film transistor is selected, and wherein said lower electrode of said compensation capacitor is connected to said display electrode, and said upper electrode thereof is connected to said compensation voltage controlling electrode bus line.

15. An active matrix liquid crystal display apparatus as claimed in claim 1, wherein said compensation capacitor is made of a ferroelectric thin film.

16. An active matrix liquid crystal display apparatus as claimed in claim 15, wherein spontaneous polarization in the ferroelectric thin film of said compensation capacitor is inverted when or just after the gate electrode of said thin film transistor is selected, to compensate for a potential fluctuation occurring in said display electrode after the gate electrode of said thin film transistor is selected.

17. An active matrix liquid crystal display apparatus as claimed in claim 16, wherein a gate selection voltage of said thin film transistor relative to the voltage of said display electrode is larger than a voltage for inverting the spontaneous polarization in said ferroelectric thin film of said compensation capacitor.

18. An active matrix liquid crystal display apparatus as claimed in claim 15, wherein the spontaneous polarization in said ferroelectric thin film of said compensation capacitor is again inverted just before said display electrode connecting said compensation capacitor is selected, to reset said compensation capacitor.

19. An active matrix liquid crystal display apparatus as claimed in claim 15, wherein one electrode of said compensation capacitor is connected to said display electrode, and the other electrode of said compensation capacitor is connected to a scan bus line that is ahead in scanning order.

* * * * *

UNITED STATES PATENT AND TRADEMARK OFFICE
CERTIFICATE OF CORRECTION

PATENT NO. : 5,369,512
DATED : Nov. 29, 1994
INVENTOR(S) : YANAI et al.

It is certified that error appears in the above-indentified patent and that said Letters Patent is hereby corrected as shown below:

TITLE PAGE: [57] ABSTRACT, after the last sentence insert the following:

--Therefore, according to the active matrix liquid crystal display apparatus of the present invention, the DC voltage level shift can be compensated for by the compensation capacitor, and a large screen at a low cost, a high yield and excellent color images can be realized.--

Col. 2, line 10, delete "an";
line 21, delete "Ser.".

Col. 12, line 40, after "layer" insert --(a--.

Col. 17, line 45, change "0N" to --ON--.

Col. 18, line 17, change "2" to --2PsS--;
line 18, delete "PsS";
line 27, change "2 PsS" to --2PsS--;
line 47, change "2 PsS" to --2PsS--.

Signed and Sealed this

Twelfth Day of September, 1995

Attest:

BRUCE LEHMAN

*Attesting Officer*  *Commissioner of Patents and Trademarks*